United States Patent
Retailleau et al.

(10) Patent No.: US 10,577,436 B2
(45) Date of Patent: Mar. 3, 2020

(54) POLYMERIZATION SYSTEM USING DOUBLE CLICK MICHAEL ADDITION AND PHOTOPOLYMERIZATION

(71) Applicant: UNIVERSITÉ DE HAUTE-ALSACE, Mulhouse (FR)

(72) Inventors: Matthieu Retailleau, Mulhouse (FR); Ahmad Ibrahim, Mulhouse (FR); Xavier Allonas, Mulhouse (FR); Céline Croutxé-Barghorn, Rantzwiller (FR)

(73) Assignee: UNIVERSITÉ DE HAUTE-ALSACE, Mulhouse (FR)

( * ) Notice: Subject to any disclaimer, the term of this patent is extended or adjusted under 35 U.S.C. 154(b) by 0 days.

(21) Appl. No.: 15/743,637

(22) PCT Filed: Jul. 6, 2016

(86) PCT No.: PCT/EP2016/065942
§ 371 (c)(1),
(2) Date: Jan. 10, 2018

(87) PCT Pub. No.: WO2017/009127
PCT Pub. Date: Jan. 19, 2017

(65) Prior Publication Data
US 2018/0319936 A1    Nov. 8, 2018

(30) Foreign Application Priority Data
Jul. 10, 2015    (EP) .................................. 15306146

(51) Int. Cl.
*C08F 2/48*    (2006.01)
*C08F 2/60*    (2006.01)
*C08G 73/02*    (2006.01)

(52) U.S. Cl.
CPC ................. *C08F 2/48* (2013.01); *C08F 2/60* (2013.01); *C08G 73/02* (2013.01)

(58) Field of Classification Search
CPC ................ C08G 73/024; C08G 81/024; C08G 2280/00; C08F 2/48; C08F 2/60; C08F 220/18
See application file for complete search history.

(56) References Cited

U.S. PATENT DOCUMENTS

2017/0198097 A1*    7/2017    Ciceron ............ C08F 222/1006

FOREIGN PATENT DOCUMENTS

WO    WO2005/048866 A2    6/2005
WO    WO2012/061702 A1    5/2012

OTHER PUBLICATIONS

Nair, D. P., et al., "Enhanced Two-Stage Reactive Polymer Network Forming Systems," Polymer 2012;53 (12):2429-2434.
(Continued)

*Primary Examiner* — Shane Fang
(74) *Attorney, Agent, or Firm* — Kenealy Vaidya LLP

(57) ABSTRACT

Some embodiments relate to a dual cure polymerization system combining aza-Michael addition polymerization and photopolymerization. Some embodiments also relate to a dual cure polymerization system for preparing interpenetrating polymer networks. Some other embodiments relate to compositions and articles obtainable by a process of the invention and uses thereof.

20 Claims, 7 Drawing Sheets

(56) References Cited

OTHER PUBLICATIONS

Nair, D. P., et al., "Two-Stage Reactive Polymer Network Forming Systems," Adv. Functional Materials 2012; XP055097405, pp. 1502-1510.
International Search Report for PCT Patent App. No. PCT/EP2016/065942 (dated Dec. 6, 2016).
Written Opinion for PCT Patent App. No. PCT/EP2016/065942 (dated Dec. 6, 2016).

\* cited by examiner

Pliability test  d = 0 j

POLYMERIZATION SYSTEM USING DOUBLE CLICK MICHAEL ADDITION AND PHOTOPOLYMERIZATION

CROSS REFERENCE TO RELATED APPLICATIONS

This application is a national phase filing under 35 C.F.R. § 371 of and claims priority to PCT Patent Application No. PCT/EP2016/065942, filed on Jul. 6, 2016, which claims the priority benefit under 35 U.S.C. § 119 of European Patent Application No. 15306146.0, filed on Jul. 10, 2015, the contents of each of which are hereby incorporated in their entireties by reference.

BACKGROUND

Some embodiments relate to a dual cure polymerization system combining aza-Michael addition polymerization and photopolymerization.

Some embodiments also relate to a dual cure polymerization system for preparing interpenetrating polymer networks.

Some embodiments also relate to compositions and articles obtainable by a process of the invention and uses thereof.

In the description below, the references between square brackets [ ] refer to the list of references presented at the end of the document.

Although there exist many photosensitive systems, the use of resins on an industrial scale remains somewhat limited. The main resins used in free-radical photopolymerization are unsaturated polyesters and functionalized oligomers acrylate. In most cases, the initial resin undergoes rapid transition from a liquid state (relatively low viscosity) to a highly reticulated vitreous solid state. It is this transition that is responsible for the polymer material's properties. Even if the panel of properties of the end product can in principle be modulated depending on the applications, in reality this possibility is limited by both the property conferred by the double-bond monomer (e.g., acrylate) and the type of polymerization used (in this case, chain polymerization (vitrification)).

SUMMARY

The ability to form polymeric networks, while controlling the polymerization dynamics and the final polymeric material's properties, could allow their use across a wide range of applications and could contribute to significant technological advances.

One of the cornerstones of promoting the development of this technology at the industrial scale lies in the development of systems leading to more varied properties, while allowing a good (spatial and time) control of the polymerization process.

At present, there is therefore a need for versatile polymerization systems that allow access to polymer compositions with a broad range of (mechanical/thermal) properties, while maintaining the utmost control of the polymerization process.

Figure 1:
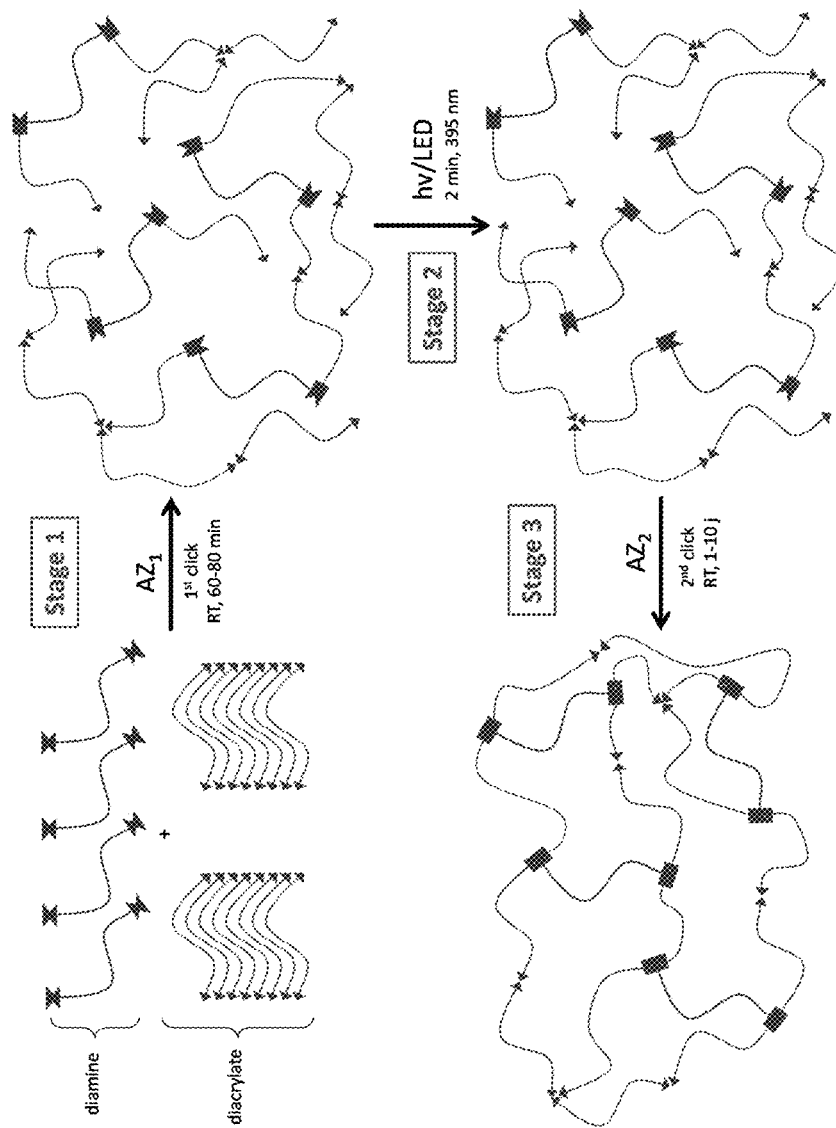
FIG. 1 is a schematic representation of the aza-Michael addition reaction.

Table 1 summarizes in-situ monitoring of reaction progress based on NMR calculated % transformation of the different species consumed or generated). (EBAD, DP-EBAD and EBAD-DP-EBAD) at different polymerization stage (reactants and products of Example 1 at different polymerization stages of the thermal aza-acrylate Michael addition with feed molar ratio 1:4.2 (Ratio cadaverine/SR349)

Table 2 summarizes EBAD conversion and Tg obtained after each of the three stage in Example 1.

Table 3 summarizes comparative acrylate conversion and Tg obtained when changing the order of the photopolymerization step.

Table 4 summarizes Tg obtained as a function of time with the polymerization system of Example 2.

Table 5 summarizes the results of the Persoz tests of Example 6.

Table 6 provides the comparative mechanical properties between the composites of Example 7 made according to the invention and purely acrylate polymers.

Definitions

To facilitate an understanding of the present invention, a number of terms and phrases are defined below:

As used herein other than the claims, the terms "a," "an," "the," and/or "said" means one or more. As used herein in the claim(s), when used in conjunction with the words "comprise," "comprises" and/or "comprising," the words "a," "an," "the," and/or "said" may mean one or more than one. As used herein and in the claims, the terms "having," "has," "is," "have," "including," "includes," and/or "include" has the same meaning as "comprising," "comprises," and "comprise." As used herein and in the claims "another" may mean at least a second or more. As used herein and in the claims, "about" refers to any inherent measurement error or a rounding of digits for a value (e.g., a measured value, calculated value such as a ratio), and thus the term "about" may be used with any value and/or range.

The use of "and/or" as part of a listing, a listing in a table, the use of "etc" as part of a listing, the phrase "such as," and/or a listing within brackets with "e.g.," or i.e., refers to any combination (e.g., any sub-set) of a set of listed components.

In general, the term "substituted" whether preceded by the term "optionally" or not, and substituents contained in formulae of this invention, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds.

The term "aliphatic", as used herein, includes both saturated and unsaturated, straight chain (i.e., unbranched) or branched aliphatic hydrocarbons, which are optionally substituted with one or more functional groups. As will be appreciated by one of ordinary skill in the art, "aliphatic" is intended herein to include, but is not limited to, alkyl, alkenyl, alkynyl moieties. As used herein, the term "alkyl", refers to straight and branched alkyl groups. An analogous convention applies to other generic terms such as "alkenyl", "alkynyl" and the like. In certain embodiments, as used herein, "lower alkyl" is used to indicate those alkyl groups (substituted, unsubstituted, branched or unbranched) having about 1-6 carbon atoms. Illustrative alkyl groups include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "alicyclic", as used herein, refers to compounds which combine the properties of aliphatic and cyclic compounds and include but are not limited to cyclic, or polycyclic aliphatic hydrocarbons and bridged cycloalkyl compounds, which are optionally substituted with one or more functional groups. As will be appreciated by one of ordinary skill in the art, "alicyclic" is intended herein to include, but is not limited to, cycloalkyl, cycloalkenyl, and cycloalkynyl moieties, which are optionally substituted with one or more functional groups. Illustrative alicyclic groups thus include, but are not limited to, for example, cyclopropyl, —CH$_2$-cyclopropyl, cyclobutyl, —CH$_2$-cyclobutyl, cyclopentyl, —CH$_2$-cyclopentyl-n, cyclohexyl, —CH$_2$-cyclohexyl, cyclohexenylethyl, cyclohexanylethyl, norbornyl moieties and the like, which again, may bear one or more substituents.

The term "cycloalkyl", as used herein, refers specifically to cyclic alkyl groups having three to seven, preferably three to ten carbon atoms. Suitable cycloalkyls include, but are not limited to cyclopropyl, cyclobutyl, cyclopentyl, cyclohexyl, cycloheptyl and the like, which, as in the case of aliphatic, heteroaliphatic or heterocyclic moieties, may optionally be substituted. An analogous convention applies to other generic terms such as "cycloalkenyl", "cycloalkynyl" and the like.

The term "heteroalkyl", as used herein, refers to aliphatic or alkyl moieties in which one or more carbon atoms in the main chain have been substituted with a heteroatom. An analogous convention applies to other generic terms such as "heteroalkenyl", "heteroalkynyl" and the like. Thus, a heteroalkyl group refers to an alkyl chain which contains one or more oxygen, sulfur, nitrogen, phosphorus or silicon atoms, i.e., in place of carbon atoms. Heteroalkyl moieties may be branched or linear unbranched.

The term "heterocyclic" or "heterocycle", as used herein, refers to compounds which combine the properties of heteroaliphatic and cyclic compounds and include but are not limited to saturated and unsaturated mono- or polycyclic heterocycles such as morpholino, pyrrolidinyl, furanyl, thiofuranyl, pyrrolyl etc., which are optionally substituted with one or more functional groups, as defined herein. In certain embodiments, the term "heterocyclic" refers to a non-aromatic 5-, 6- or 7-membered ring or a polycyclic group, including, but not limited to a bi- or tri-cyclic group including fused six-membered rings having between one and three heteroatoms independently selected from oxygen, sulfur and nitrogen, wherein (i) each 5-membered ring has 0 to 2 double bonds and each 6-membered ring has 0 to 2 double bonds, (ii) the nitrogen and sulfur heteroatoms may optionally be oxidized, (iii) the nitrogen heteroatom may optionally be quaternized, and (iv) any of the above heterocyclic rings may be fused to an aryl or heteroaryl ring. Representative heterocycles include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

In general, the term "aromatic moiety" or "aryl", as used herein, refers to stable substituted or unsubstituted unsaturated mono- or polycyclic hydrocarbon moieties having preferably 3-14 carbon atoms, including at least one ring satisfying the Hückel rule for aromaticity. Examples of aromatic moieties include, but are not limited to, phenyl, indanyl, indenyl, naphthyl, phenanthryl and anthracyl.

As used herein, the term "heteroaryl moiety" refers to unsaturated mono-heterocyclic or polyheterocyclic moieties having preferably 3-14 carbon atoms and at least one ring atom selected from S, O and N, including at least one ring satisfying the Hückel rule for aromaticity. The term "heteroaryl" refers to a cyclic unsaturated radical having from about five to about ten ring atoms of which one ring atom is selected from S, O and N; zero, one or two ring atoms are additional heteroatoms independently selected from S, O and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like. Examples of heteroaryl moieties include, but are not limited to, pyridyl, quinolinyl, dihydroquinolinyl, isoquinolinyl, quinazolinyl, dihydroquinazolyl, and tetrahydroquinazolyl.

The term "amine" refers to a group having the structure —N(R)$_2$ wherein each occurrence of R is independently hydrogen, or an aliphatic, heteroaliphatic, aryl or heteroaryl moiety, or the R groups, taken together, may form a heterocyclic moiety.

The term "halogen" as used herein refers to an atom selected from fluorine, chlorine, bromine and iodine.

As used herein, the term "independently" refers to the fact that the substituents, atoms or moieties to which these terms refer, are selected from the list of variables independently from each other (i.e., they may be identical or the same).

As used herein, the term "about" can refer to a variation of ±5%, ±10%, ±20%, or ±25%, of the value specified. For example, "about 50" percent can in some embodiments carry a variation from 45 to 55 percent. For integer ranges, the term "about" can include one or two integers greater than and/or less than a recited integer. Unless indicated otherwise herein, the term "about" is intended to include values, e.g., weight percents, proximate to the recited range that are equivalent in terms of the functionality of the individual ingredient, the composition, or the embodiment.

As used herein, the term "and/or" means any one of the items, any combination of the items, or all of the items with which this term is associated.

DETAILED DESCRIPTION OF EXEMPLARY EMBODIMENTS

As will be understood by one of ordinary skill in the art, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. As will be understood by one skilled in the art, for any and all purposes, particularly in terms of providing a written description, all ranges recited herein also encompass any and all possible subranges and combinations of subranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to," "at least," "greater than," "less than," "more than," "or more," and the like, include the number recited and such terms refer to ranges that can be subsequently broken down into subranges as discussed above. In the same manner, all ratios recited herein also include all subratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

As discussed above, it may be advantageous to provide scalable resins for the production of polymer materials/ compositions in several steps, and polymerization systems allowing to control the properties of the resin throughout the manufacturing of the materials and adapt those properties to different process steps depending on the desired material. In this context, there is provided herein efficient polymerization methods able to address or accomplish this goal.

1) General Description of Polymerization System and Methods of the Embodiments

In one aspect, there is provided a dual cure polymerization process including:
i) reacting an electrophile monomer having the structure (I) or (II):

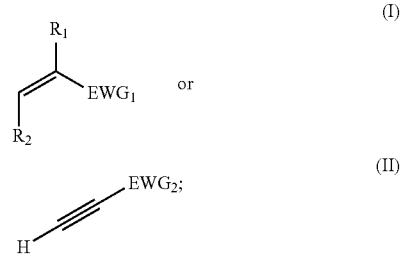

wherein:
$R_1$ represents H, methyl or CN;
$R_2$ represents H or, when $EWG_1$ represents $-C(=O)NHR^4$, $R_2$ and $R^4$ together represent an oxo moiety $-C(=O)-$;
$EWG_1$ and $EWG_2$ independently represent an electron withdrawing group optionally containing one or more additional Michael acceptor double-bonds and/or radically polymerizable double bonds;
with a nucleophile monomer, $R_3-NH_2$, bearing a primary amine functional group wherein $R_3$ represents the nucleophile monomer radical;
wherein the Michael acceptor double-bonds of the electrophile monomer are in stoichiometric excess relative to the primary amine functional groups of the nucleophile monomer;
thereby forming a secondary amine Michael adduct ($I^A$) or ($II^A$) having the structure:

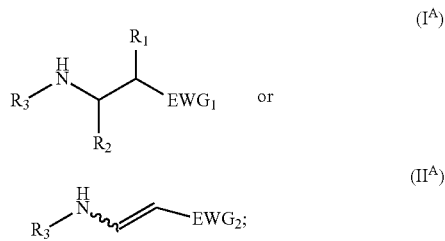

ii) subjecting the product obtained in step i) to a suitable light source to effect photopolymerization of residual unreacted Michael acceptor double-bonds and/or radically polymerizable double bonds; and
iii) allowing the Michael adduct secondary amine functional groups to further undergo Michael addition with residual unreacted Michael acceptor double-bonds.

Steps i) through iii) are carried out in sequential order i)→ii)→iii). Advantageously, irradiation step ii) is carried out when step i) is substantially complete. As used here, the term "complete" means that the aza Michael reaction of step i) has reached a steady state whereby the conversion rate (I)→($I^A$) or (II)→($II^A$) is about zero. The conversion rate may be determined by conventional methods, such as following the reaction by NMR.

As is widely reported in the literature, the reactivity of amines in the case of the Michael addition is as follows: secondary amine (original)>primary amine>2° amine (formed). Thus, when the reactivity between primary amines (starting nucleophile monomer) and secondary amines (Michael adduct obtained in step ii)) is sufficiently different, the polymerization process may be considered as a multi-step method. In this case, by taking advantage of the aza-Michael reaction, i.e., by taking advantage of the difference in reactivity between AZ1 (step (i)) and AZ2 (step (iii)), a photochemical step (ii) may be inserted between the two aza-Michael steps to reinforce the mechanical properties (FIG. 1). In other words, the difference in reactivity between AZ1 and AZ2 allows to use photochemistry in a controllable and reproducible way to fine-tune the properties of the end-product.

Electrophile Monomer

Advantageously, the electrophile monomer if of formula (I) above, wherein $R_1$ represents H or methyl.

When $R_1$ is methyl, the double bond of monomer (I) is less reactive to the Michael addition. In this case, a catalyst may be used in the reaction mixture to allow the Michael addition in steps (i) and (iii) to proceed. Accordingly, when $R_1$ is methyl, steps (i) and (iii) may be carried out in the presence of a suitable catalyst. Any catalyst conventionally used in Michael addition chemistry may be used. Exemplary catalysts include:

a Brönsted base, for example:
  tertiary and secondary amine such as TBD: 1,5,7-Triazabicyclo[4.4.0]dec-5-ene, MTBD: 7-Methyl-1,5,7-triazabicyclo[4.4.0]dec-5-ene, DBU: 1,8-diazabicyclo[5.4.0]undec-7-ene, DBN: 1,5-Diazabicyclo[4.3.0]non-5-ene, TMG: 1,1,3,3-tetramethylguanidine, 1-Azabicyclo[2.2.2]octane, TMP: 2,2,6,6-Tetramethylpiperidine, tributylamine, N-Methylmorpholine, pyridine, DABCO: 1,4-diazabicyclo[2.2.2]octane, Tetramethylethylenediamine, trimethylamine, TED: 1,4-Diazabicyclo[2.2.2]octane, Trimethylpyridine, dimethylpyridine, 1,2,2,6,6-Pentamethylpiperidine
  hydroxide bases
  methoxide bases
  sodium and potassium carbonate
  potassium tert-butoxide
a Brönsted acid such as boric acid, peracetic acid, polystyrenesulfonic acid, tungstophosphoric acid, bis(trifluoromethanesulfon)-imide ($Tf_2NH$), triflic acid (i.e., trifluoromethanesulfonic acid), tetrafluoroboric acid, sulfonic acids, aqueous or hydrated acids;
a Lewis acid such as $PtCl_4.5H_2O$, $Cu(OTf)_2$, $InCl_3$, $Yb(OTf_3)$, $LiClO_4$, $Bi(NO_3)$, $FeCl_3.6H_2O$, $CeCl_3.7H_2O$, ZnO, MgO, silica supported perchloric acid, sulfated zirconia, $Y(NO_3)_3.6H_2O$
Other catalysts such as ceric ammonium nitrate, Basic ionic liquid [bmim]OH (1-butyl-3-methylimidazolium hydroxide), DBU ionic liquids, lanthanides, or phosphines.

Advantageously, $R_1$ is H. In that case, the double bond of monomer (I) is reactive to the Michael addition without the need of a catalyst. In fact, amines act as Michael addition catalysts. Accordingly, the nucleophile monomer $R_3$—$NH_2$ act as an in situ catalyst.

Advantageously, the electrophile monomer (I) represents an acrylate ester monomer, an acrylonitrile monomer, an acrylamide monomer, a maleimide monomer, a cyanoacrylate monomer, a vinylsulfone monomer, an α,β-unsaturated ketone monomer, an α,β-unsaturated aldehyde monomer, a nitro ethylene monomer, a vinylphosphonate monomer, a vinylpyridine monomer, a β-keto acetylene monomer, or an acetylene ester monomer. Any acrylate ester, acrylonitrile, acrylamide, maleimide, cyanoacrylate, vinylsulfone, α,β-unsaturated ketone, α,β-unsaturated aldehyde, nitro ethylene, vinylphosphonate, vinylpyridine, β-keto acetylene, acetylene ester monomer suitable for Michael addition may be used in the context of the present invention.

For example, the electrophile monomer (I) may represent an acrylate ester monomer wherein $R_1$ and $R_2$ are each H and $EWG_1$ represents

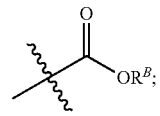

wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —$OR^{B1}$ where $R^{B1}$ represents $C_{1-6}$alkyl; and each of the alkyl, alkenyl and alkynyl moieties may be linear, branched or cyclic. For example, $R^B$ may represent $C_{1-20}$alkyl, $C_{1-20}$heteroalkyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with $C_{1-6}$alkyl, $C_{6-10}$aryl, or —$OR^{B1}$ where $R^{B1}$ represents $C_{1-6}$alkyl; and each of the alkyl moieties may be linear, branched or cyclic. Preferably $R^B$ represents a linear, branched or cyclic $C_{1-6}$alkyl moiety or a $C_{6-10}$aryl moiety.

The electrophile monomer (I) may represent an acrylonitrile monomer wherein $R_1$ and $R_2$ are each H and $EWG_1$ represents

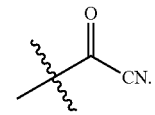 [SMILES: *C(=O)C#N]

The electrophile monomer (I) may represent an acrylamide monomer wherein $R_1$ and $R_2$ are each H and $EWG_1$ represents

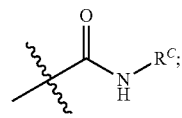

wherein $R^C$ represents H, $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —$OR^{C1}$ where $R^{C1}$ represents $C_{1-6}$alkyl; and each of the alkyl, alkenyl and alkynyl moieties may be linear, branched or cyclic. Preferably preferably $R^C$ represents a linear, branched or cyclic $C_{1-6}$alkyl moiety or a $C_{6-10}$aryl moiety.

The electrophile monomer (I) may represent a maleimide monomer having the structure

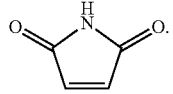

The electrophile monomer (I) may represent a cyanoacrylate monomer wherein $R_1$ is —CN, $R_2$ is H, and $EWG_1$ represents

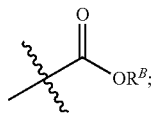

wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —OR$^{B1}$ where $R^{B1}$ represents $C_{1-6}$alkyl; and each of the alkyl, alkenyl and alkynyl moieties may be linear, branched or cyclic. For example, $R^B$ may represent $C_{1-20}$alkyl, $C_{1-20}$heteroalkyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with $C_{1-6}$alkyl, $C_{6-10}$aryl, or —OR$^{B1}$ where $R^{B1}$ represents $C_{1-6}$alkyl; and each of the alkyl moieties may be linear, branched or cyclic. Preferably $R^B$ represents a linear, branched or cyclic $C_{1-6}$alkyl moiety or a $C_{6-10}$aryl moiety.

The electrophile monomer (I) may represent a vinylsulfone monomer wherein $R_1$ and $R_2$ are each H and $EWG_1$ represents

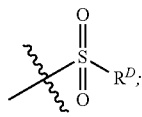

wherein $R^D$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —OR$^{D1}$ where $R^{D1}$ represents $C_{1-6}$alkyl; and each of the alkyl, alkenyl and alkynyl moieties may be linear, branched or cyclic. For example, $R^D$ may represent $C_{1-20}$alkyl, $C_{2-20}$alkenyl, $C_{1-20}$heteroalkyl, $C_{2-20}$heteroalkenyl, or $C_{6-10}$aryl; wherein each of the foregoing groups may be optionally substituted with $C_{1-6}$alkyl, $C_{6-10}$aryl, or —OR$^{D1}$ where $R^{D1}$ represents $C_{1-6}$alkyl; and each of the alkyl and alkenyl moieties may be linear, branched or cyclic. Preferably $R^D$ represents a linear, branched or cyclic $C_{1-6}$alkyl moiety, a $C_{6-10}$aryl moiety or a vinyl moiety.

The electrophile monomer (I) may represent an α,β-unsaturated ketone monomer wherein $R_1$ and $R_2$ are each H and $EWG_1$ represents

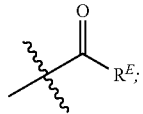

wherein $R^E$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —OR$^{E1}$ where $R^{E1}$ represents $C_{1-6}$alkyl; and each of the alkyl, alkenyl and alkynyl moieties may be linear, branched or cyclic. For example, $R^E$ may represent $C_{1-20}$alkyl, $C_{2-20}$alkenyl, $C_{1-20}$heteroalkyl, $C_{2-20}$heteroalkenyl, $C_{7-20}$aralkyl, $C_{6-10}$aryl, or 5 or 6-membered heteroaryl; wherein each of the foregoing groups may be optionally substituted with $C_{1-6}$alkyl, $C_{6-10}$aryl, or —OR$^{E1}$ where $R^{E1}$ represents $C_{1-6}$alkyl; and each of the alkyl and alkenyl moieties may be linear, branched or cyclic. Preferably $R^E$ represents a linear, branched or cyclic $C_{1-6}$alkyl moiety or a $C_{6-10}$aryl moiety.

The electrophile monomer (I) may represent an α,β-unsaturated aldehyde monomer wherein $R_1$ and $R_2$ are each H and $EWG_1$ represents

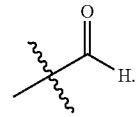

The electrophile monomer (I) may represent a nitro ethylene monomer wherein $R_1$ and $R_2$ are each H and $EWG_1$ represents —$NO_2$.

The electrophile monomer (I) may represent a vinylphosphonate monomer wherein $R_1$ and $R_2$ are each H and $EWG_1$ represents

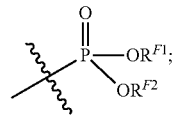

wherein $R^{F1}$ and $R^{F2}$ independently represent $C_{1-20}$alkyl, $C_{2-20}$alkenyl, $C_{2-20}$alkynyl, $C_{7-20}$aralkyl, or $C_{6-10}$aryl; wherein each of the foregoing groups may be optionally substituted with halogen, —CN, $C_{1-6}$alkyl, $C_{6-10}$aryl, or —OR$^{FF1}$ where $R^{FF1}$ represents $C_{1-6}$alkyl; and each of the alkyl, alkenyl and alkynyl moieties may be linear, branched or cyclic. For example, $R^{F1}$ and $R^{F2}$ may independently represent $C_{1-20}$alkyl or $C_{6-10}$aryl; wherein each of the foregoing groups may be optionally substituted with $C_{1-6}$alkyl, $C_{6-10}$aryl, or —OR$^{FF1}$ where $R^{FF1}$ represents $C_{1-6}$alkyl; and each of the alkyl moieties may be linear, branched or cyclic. Preferably $R^{F1}$ and $R^{F2}$ independently represent $C_{1-6}$alkyl.

The electrophile monomer (I) may represent a vinylpyridine monomer having the structure

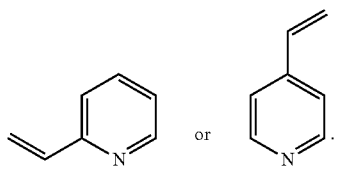

The electrophile monomer (I) may represent a β-keto acetylene monomer wherein $EWG_2$ represents

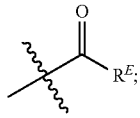

wherein $R^E$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —$OR^{E1}$ where $R^{E1}$ represents $C_{1-6}$alkyl; and each of the alkyl, alkenyl and alkynyl moieties may be linear, branched or cyclic. For example, $R^E$ may represent $C_{1-20}$alkyl, $C_{2-20}$alkenyl, $C_{1-20}$heteroalkyl, $C_{2-20}$heteroalkenyl, $C_{7-20}$aralkyl, $C_{6-10}$aryl, or 5 or 6-membered heteroaryl; wherein each of the foregoing groups may be optionally substituted with $C_{1-6}$alkyl, $C_{6-10}$aryl, or —$OR^{E1}$ where $R^{E1}$ represents $C_{1-6}$alkyl; and each of the alkyl and alkenyl moieties may be linear, branched or cyclic. Preferably $R^E$ represents a linear, branched or cyclic $C_{1-6}$alkyl moiety or a $C_{6-10}$aryl moiety.

The electrophile monomer (I) may represent an acetylene ester monomer wherein $EWG_2$ represents

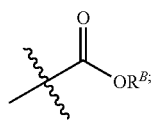

wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —$OR^{B1}$ where $R^{B1}$ represents $C_{1-6}$alkyl; and each of the alkyl, alkenyl and alkynyl moieties may be linear, branched or cyclic. For example, $R^B$ may represent $C_{1-20}$alkyl, $C_{1-20}$heteroalkyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with $C_{1-6}$alkyl, $C_{6-10}$aryl, or —$OR^{B1}$ where $R^{B1}$ represents $C_{1-6}$alkyl; and each of the alkyl moieties may be linear, branched or cyclic. Preferably $R^B$ represents a linear, branched or cyclic $C_{1-6}$alkyl moiety or a $C_{6-10}$aryl moiety.

Advantageously, each of the foregoing $R^B$, $R^C$, $R^D$, $R^E$, $R^{F1}$ and $R^{F2}$ substituents may further bear one or more additional Michael acceptor double-bonds and/or radically polymerizable double bonds. For example, each of the foregoing $R^B$, $R^C$, $R^D$, $R^E$, $R^{F1}$ and $R^{F2}$ substituents may further bear one or more acryl or methacryl groups:

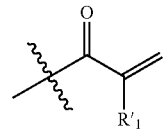

wherein R'1 represents H or methyl, preferably H. More preferably, each of the $R^B$, $R^C$, $R^D$, $R^E$, $R^{F1}$ and $R^{F2}$ substituents may further bear one or more acrylate or methacrylate groups, most preferably acrylate groups.

Advantageously, the electrophile monomer (I) may be an acrylate ester, acrylonitrile, acrylamide, maleimide, cyanoacrylate, vinylsulfone, or α,β-unsaturated ketone monomer, as further defined above. Advantageously, the electrophile monomer (I) may be an acrylate ester, as further defined above. More advantageously, the electrophile monomer (I) may be an acrylate ester having the structure:

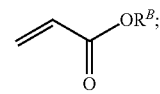

wherein $R^B$ is as defined above.

Accordingly, there is provided a dual cure polymerization process including:

(i) reacting an electrophile monomer having the structure (I):

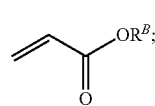

(I)

wherein:
wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —$OR^{B1}$ where $R^{B1}$ represents $C_{1-6}$alkyl; and each of the alkyl, alkenyl and alkynyl moieties may be linear, branched or cyclic; and wherein $R^B$ contains one or more additional Michael acceptor double-bonds and/or radically polymerizable double bonds, for example one or more acryl or methacryl groups:

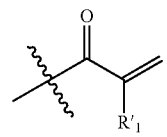

wherein R'1 represents H or methyl, preferably H; more preferably, $R^B$ optionally bears one or more acrylate or methacrylate groups, most preferably acrylate groups;

with a nucleophile monomer, $R_3$—$NH_2$, bearing a primary amine functional group wherein $R_3$ represents the nucleophile monomer radical;

wherein the Michael acceptor double-bonds of the electrophile monomer are in stoichiometric excess relative to the primary amine functional groups of the nucleophile monomer;

thereby forming a secondary amine Michael adduct (I⁴) or (II⁴) having the structure:

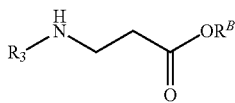
(I⁴)

(ii) subjecting the product obtained in step i) to a suitable light source to effect photopolymerization of residual unreacted Michael acceptor double-bonds and/or radically polymerizable double bonds; and
(iii) allowing the Michael adduct secondary amine functional groups to further undergo Michael addition with residual unreacted Michael acceptor double-bonds.

For example, $R^B$ may represent $C_{1-20}$alkyl, $C_{1-20}$heteroalkyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with $C_{1-6}$alkyl, $C_{6-10}$aryl, or —$OR^{B1}$ where $R^{B1}$ represents $C_{1-6}$alkyl; and each of the alkyl moieties may be linear, branched or cyclic. Preferably $R^B$ represents a linear, branched or cyclic $C_{1-6}$alkyl moiety or a $C_{6-10}$aryl moiety.

The acrylate monomer may be any acrylate resin known in the art. For example, the electrophile monomer may be an acrylate, a polyester acrylate, a urethane acrylate, an epoxy acrylate, or a silicone acrylate monomer. Such acrylate resins are commercially available, for example from Sartomer, or Allnex.

As examples of acrylate monomers, we may mention:
Monofunctional acrylate monomers
Tertiobutyl cyclohexanol acrylate (TBCHA) SR217®
2-(2-ethoxyethoxy) ethyl acrylate (EOEOEA) SR256®
C16/C18 alkyl acrylate SR257C®
Tetrahydrofurfuryl acrylate (THFA) SR285®
C12 alkyl acrylate (Lauryl acrylate) SR335®
C12/C14 acrylate SR336®
2-phenoxyethyl acrylate (2-PEA) SR339C®
Isodecyl acrylate (IDA) SR395®
Ethoxylated 4 phenyl acrylate (P4EOA) SR410®
3,3,5-trimethyl cyclohexanol acrylate (TMCHA) SR420®
Iso octyl acrylate (IOA) SR440®
Octyl decyl acrylate (ODA) SR484®
Tridecyl acrylate (TDA) SR489®
Polycaprolactone acrylate (CAPA) SR495B®
Ethoxylated 4 nonyl phenol acrylate (NP4EOA) SR504D®
Isobornyl acrylate (IBOA) SR506D®
Cyclic trimethylolpropane formal acrylate (CTFA) SR531®
Ethoxylated (5) hexanediol diacrylate (HD5EODA) SR561®
C18 alkyl acrylate (Stearyl acrylate) SR586®
C18/C22 alkyl acrylate (Behenyl acrylate) SR587®
Bifunctional acrylate monomers
1,6-hexanediol diacrylate (HDDA) SR238®
Polyethylene glycol (200) diacrylate (PEG200DA) SR259®
Tetraethylene glycol diacrylate (TTEGDA) SR268G®
Triethylene glycol diacrylate (TIEGDA) SR272®
Tripropylene glycol diacrylate (TPGDA) SR306®
Polybutadiene diacrylate (PBDDA) SR307®
3-methyl 1,5-pentanediol diacrylate (MPDA) SR341®
Polyethylene glycol (400) diacrylate (PEG400DA) SR344®
Ethoxylated 3 bisphenol A diacrylate (BPA3EODA) SR349®
Dipropylene glycol diacrylate (DPGDA) SR508®
1,10 decanediol diacrylate (DDDA) SR595®
Ethoxylated 4 bisphenol A diacrylate (BPA4EODA) SR601E®
Ethoxylated 10 bisphenol A diacrylate (BPA10EODA) SR602®
Esterdiol diacrylate (EDDA) SR606A®
Polyethylene glycol 600 diacrylate (PEG600DA) SR610®
Alkoxylated diacrylate SR802®
Tricyclodecanedimethanol diacrylate (TCDDMDA) SR833S®
Propoxylated 2 neopentyl glycol diacrylate (PONPGDA) SR9003®
Trifunctional acrylate monomers
Trimethylolpropane triacrylate (TMPTA) SR351®
Tris (2-hydroxyethyl) isocyanurate triacrylate (THEICTA) SR368®
Pentaerythritol triacrylate (PETIA) SR444D®
Ethoxylated 3 trimethylolpropane triacrylate (TMP3EOTA) SR415®
Propoxylated 3 trimethylolpropane triacrylate (TMP3POTA) SR492®
Ethoxylated 6 trimethylolpropane triacrylate (TMP6EOTA) SR499®
Ethoxylated 9 trimethylolpropane triacrylate (TMP9EOTA) SR502®
Propoxylated 3 glyceryl triacrylate (GPTA) SR9020®
Ethoxylated 15 trimethylolpropane triacrylate (TMP15EOTA) SR9035®
Trimethylolpropane triacrylate (TMPTA) SR351®
Ethoxylated 12 glyceryl triacrylate (G12EOTA) SR9046®
Ethoxylated (20) trimethylolpropane triacrylate (TMP20EOTA)
Tetrafunctional acrylate monomers
Ethoxylated 4 pentaerythritol tetraacrylate (PETTA) SR494®
Di-trimethylolpropane tetraacrylate (Di TMPTTA) SR355®
Higher acrylate monomers (functionality >4)
Dipentaerythritol pentaacrylate (Di PEPA) SR399®

As examples of polyester acrylate monomers, we may mention: monofunctional polyester acrylate monomers, bifunctional polyester acrylate monomers (such as, CN2036®, CN2203®, CN2267®, CN2505®, CN2609®, CN2610®), trifunctional polyester acrylate monomers such as CN2634®, tetrafunctional polyester acrylate monomers such as CN203®, CN2555®, CN2560®, CN2295®, CN2303®, CN2305®, CN2562®, CN291®, CN293®.

As examples of urethane acrylate monomers, we may mention: monofunctional urethane acrylate monomers; bifunctional urethane acrylate monomers such as CN9001®, CN9002®, CN910A70®, CN9167®, CN9170A86®, CN9200®, CN963B80®, CN964A85®, CN965®, CN966H90®, CN9761®, CN9761A75®, CN981®, CN991®, CN996®; trifunctional urethane acrylate monomers such as CN9245S®, CN9250A75®, CN9260D75®, CN970A60®, CN998B80®; tetrafunctional urethane acrylate monomers such as CN9165A®, CN925®, CN9276®; higher urethane acrylate monomers (functionality >4) such as CN9210®, CN9215®, CN9400®.

As examples of epoxy acrylate monomers, we may mention: monofunctional epoxy acrylate monomers such as CN131B®, CN152®; bifunctional epoxy acrylate monomers such as CN UVE150/80®, CN UVE151M®, CN104®, CN104A60®, CN104A80®, CN104B80®, CN104D80®, CN109®, CN110®, CN116®, CN132®, CN164®, CN186®, CN2003EU®; trifunctional epoxy acrylate monomers such as CN112C60®, CN113D70®, CN122A80®, CN127®; tetrafunctional epoxy acrylate monomers; higher epoxy acrylate monomers (functionality >4) such as CN111®.

Propoxylated 2 neopentyl glycol diacrylate (PONPGDA), Trimethylolpropane triacrylate (TMPTA), Tris (2-hydroxyethyl) isocyanurate triacrylate (THEICTA), Pentaerythritol triacrylate (PETIA), Ethoxylated 3 trimethylolpropane triacrylate (TMP3EOTA), Propoxylated 3 trimethylolpropane triacrylate (TMP3POTA), Ethoxylated 6 trimethylolpropane triacrylate (TMP6EOTA), Ethoxylated 9 trimethylolpropane triacrylate (TMP9EOTA), Propoxylated 3 glyceryl triacrylate (GPTA), Ethoxylated 15 trimethylolpropane triacrylate (TMP15EOTA), Trimethylolpropane triacrylate (TMPTA), Ethoxylated 12 glyceryl triacrylate (G12EOTA), Ethoxylated (20) trimethylolpropane triacrylate (TMP20EOTA), Ethoxylated 4 pentaerythritol tetraacrylate (PETTA), Di-trimethylolpropane tetraacrylate (Di TMPTTA), Dipentaerythritol pentaacrylate (Di PEPA),

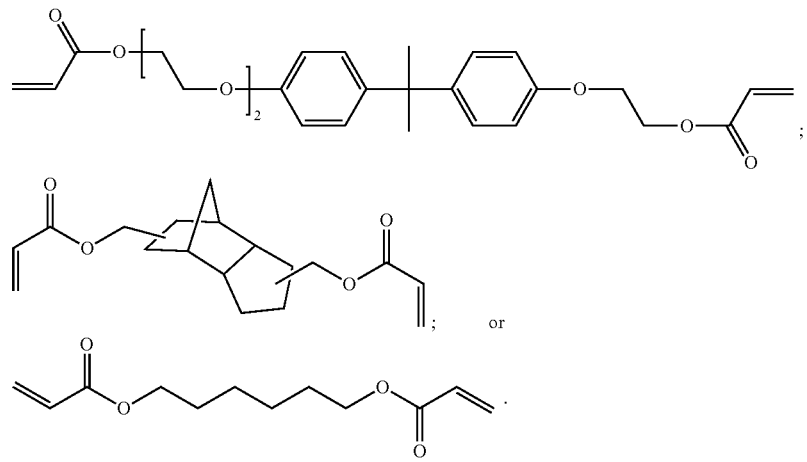

As examples of silicone acrylate monomers, we may mention bifunctional silicone acrylate monomers such as CN9800®.

For example, the electrophile monomer may be Tertiobutyl cyclohexanol acrylate (TBCHA), 2-(2-ethoxyethoxy) ethyl acrylate (EOEOEA), C16/C18 alkyl acrylate, Tetrahydrofurfuryl acrylate (THFA), C12 alkyl acrylate (Lauryl acrylate), C12/C14 acrylate, 2-phenoxyethyl acrylate (2-PEA), Isodecyl acrylate (IDA), Ethoxylated 4 phenyl acrylate (P4EOA), 3,3,5-trimethyl cyclohexanol acrylate (TMCHA), Iso octyl acrylate (IOA), Octyl decyl acrylate (ODA), Tridecyl acrylate (TDA), Polycaprolactone acrylate (CAPA), Ethoxylated 4 nonyl phenol acrylate (NP4EOA), Isobornyl acrylate (IBOA), Cyclic trimethylolpropane formal acrylate (CTFA), Ethoxylated (5) hexanediol diacrylate (HD5EODA), C18 alkyl acrylate (Stearyl acrylate), C18/C22 alkyl acrylate (Behenyl acrylate), 1,6-hexanediol diacrylate (HDDA), Polyethylene glycol (200) diacrylate (PEG200DA), Tetraethylene glycol diacrylate (TTEGDA), Triethylene glycol diacrylate (TIEGDA), Tripropylene glycol diacrylate (TPGDA), Polybutadiene diacrylate (PBDDA), 3-methyl 1,5-pentanediol diacrylate (MPDA), Polyethylene glycol (400) diacrylate (PEG400DA), Ethoxylated 3 bisphenol A diacrylate (BPA3EODA), Dipropylene glycol diacrylate (DPGDA), 1,10 decanediol diacrylate (DDDA), Ethoxylated 4 bisphenol A diacrylate (BPA4EODA), Ethoxylated 10 bisphenol A diacrylate (BPA10EODA), Esterdiol diacrylate (EDDA), Polyethylene glycol 600 diacrylate (PEG600DA), Alkoxylated diacrylate, Tricyclodecanedimethanol diacrylate (TCDDMDA), Advantageously, the electrophile monomer contains one Michael acceptor double-bond, and the nucleophile monomer contains one primary amine functional group.

Advantageously, the electrophile monomer contains two Michael acceptor double-bonds, and the nucleophile monomer contains two primary amine functional groups. Advantageously, the electrophile monomer may have the structure:

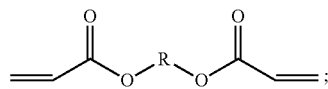

wherein R represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, —$OR^A$ where $R^A$ represents $C_{1-6}$alkyl; and each of the alkyl, alkenyl and alkynyl moieties may be linear, branched or cyclic. For example, R may represent $C_{1-20}$alkyl, $C_{1-20}$heteroalkyl, $C_{7-20}$aralkyl, $C_{1-20}$heteroalkyl$C_{6-10}$aryl or $C_{6-10}$aryl; wherein each of the foregoing groups may be optionally substituted with $C_{1-6}$alkyl, $C_{6-10}$aryl, —$OR^A$ where $R^A$ represents $C_{1-6}$alkyl; and each of the alkyl moieties may be linear, branched or cyclic. Advantageously, this electrophile monomer may be reacted by a diamine in step (i) of the method of the invention.

Nucleophilic Monomer

The nucleophilic monomer $R_3$—$NH_2$ may be any compound bearing a primary amine functional group. Preferably, the nucleophilic monomer may not contain functional groups that may be more reactive towards the Michael acceptor double-bonds present on the electrophile monomer than primary amines, so as not to compete with the Aza-Michael reaction. As such, the nucleophilic monomer may contain —OH or —SH functional groups which are less reactive than primary amine functional groups towards Michael addition.

Advantageously, $R_3$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{6-10}$aryl, 5 or 6-membered heteroaryl, or 5 or 6-membered heterocycle; wherein each of the foregoing groups may be optionally substituted with —$NH_2$, halogen, —CN, $C_{1-6}$alkyl, —C(=O)$OR^{3A}$ where $R^{3A}$ represents $C_{1-6}$alkyl or $C_{6-10}$aryl, or —$OR^{3B}$ where $R^{3B}$ represents H, $C_{1-6}$alkyl or $C_{6-10}$aryl optionally further substituted with —$NH_2$; and each of the alkyl, alkenyl and alkynyl moieties may be linear, branched or cyclic. For example, $R_3$ may represent $C_{1-20}$alkyl, $C_{1-20}$heteroalkyl, $C_{7-20}$aralkyl or $C_{6-10}$aryl; wherein each of the foregoing groups may be optionally substituted with —$NH_2$, $C_{1-6}$alkyl, —C(=O)$OR^{3A}$ where $R^{3A}$ represents $C_{1-6}$alkyl or $C_{6-10}$aryl, or —$OR^{3B}$ where $R^{3B}$ represents H, $C_{1-6}$alkyl or $C_{6-10}$aryl optionally further substituted with —$NH_2$; and each of the alkyl moieties may be linear, branched or cyclic.

The nucleophilic monomer $R_3$—$NH_2$ may be an aliphatic or cyclo-aliphatic primary amine, such as:
- monofunctional amines: for example, hexylamine, diethylaminopropylamine, 1,3-Dimethylamylamine, Ethanolamine, Isobutylamine, Tyramine;
- bifunctional amines: for example, 1,2-diaminoethane NH2-(CH2)2-NH2, 1,4-diaminobutane NH2-(CH2)4-NH2, 1,6-diaminohexane NH2-(CH2)6-NH2, 1,8-diaminooctane NH2-(CH2)8-NH2, 1,12-diaminododecane NH2-(CH2)12-NH2, 1,16-diaminohexadecane NH2-(CH2)16-NH2, isophorone diamine (IPDA), 3,3'-Dimethyl-4,4'diamino-dicyclohexylmethane, Neopentanediamine, 3,3'-Diamino-N-methyldipropylamine, 1,3-Cyclohexanebis(methylamine), 1,2-Diaminocyclohexane, 2,2-Bis(aminoethoxy)propane, 1,5-Diamino-2-methylpentane, 4,4'-Methylenebis(cyclohexylamine), 4,4'-Methylenebis(2,6-diethylaniline), 3,3'-Methylenedianiline, 4,4'-(1,4-Phenylenediisopropylidene)bisaniline, 4,4'-(1,3-Phenylenedioxy)dianiline, Poly(1,4-butanediol)bis(4-aminobenzoate), 2,4,6-Trimethyl-m-phenylenediamine;
- trifunctional amines: for example, tris(2-aminoethyl) amine N[(CH$_2$)$_2$—NH$_2$]$_3$ The nucleophilic monomer $R_3$—$NH_2$ may be an aromatic primary amine, such as: Ar—CH2-NH2, NH2-Ar—NH2, NH2-CH2-Ar—CH2-NH2, —NH2-Ar—CH2-NH2, Ar—CH2-NH—(CH2)2-NH2, NH2-Ar—Ar—NH2 or NH2-Ar—O—Ar—NH2, wherein Ar represents an optionally substituted phenyl moiety. For example, the nucleophilic monomer $R_3$—$NH_2$ may be an aromatic primary amine, such as:
- monofunctional aromatic amines: for example, benzylamine (Ph-CH$_2$—NH$_2$), aniline (Ph-NH2), toluene amine, 2-Aminophenyl disulfide, 4-Aminophenyl disulfide;
- difunctional aromatic amines: for example, 1,2-benzendiamine (NH$_2$-Ph-NH$_2$), 1,3-benzendiamine (NH$_2$-Ph-NH$_2$), 1,4-benzendiamine (NH$_2$-Ph-NH$_2$), 1,2-benzendimethanamine (NH$_2$—CH$_2$-Ph-CH$_2$—NH$_2$), 1,3-benzendimethanamine (NH$_2$—CH$_2$-Ph-CH$_2$—NH$_2$), 1,4-benzendimethanamine (NH$_2$—CH$_2$-Ph-CH$_2$—NH$_2$), 2-aminobenzylamine (NH$_2$-Ph-CH$_2$—NH$_2$), biphenyldiamine (NH$_2$-Ph-Ar—NH$_2$), 4,4'-oxydianiline (NH$_2$-Ph-O-Ph-NH$_2$), -4,4'-(1,1'-Biphenyl-4,4'-diyldioxy)dianiline, 3,4-Diaminobenzophenone, 4,4'-Diaminobenzophenone, 4,4'-Diaminooctafluorobiphenyl, 2,4-Diaminotoluene, 4,4'-(Hexafluoroisopropylidene) dianiline, 4,4'-(4,4'-Isopropylidenediphenyl-1,1'-diyldioxy)dianiline; or
- higher aromatic amines (functionality>3): for example, 1,2,4,5-Benzenetetracarboxamide.

The nucleophilic monomer $R_3$—$NH_2$ may also be an amino ether compound, such as: 4,9-Dioxadodecane-1,12-diamine, 4,7,10-Trioxatridecane-1,13-diamine, 2,2'-(Ethylenedioxy)bis(ethylamine), Poly(ethylene glycol) bis (amine), Polyetheramine D 230, Polyetheramine D 400, Polyetheramine D 2000 or Polyetheramine T 403, all commercially available from BASF.

The nucleophilic monomer $R_3$—$NH_2$ may also be an aminoacid, an aminoalcohol (e.g., ethanolamine) or an aminophosphate.

Advantageously, the nucleophilic monomer may be 1-hexylamine or 1,5-diaminopentane, preferably 1,5-diaminopentane.

Advantageously, the electrophile monomer contains two Michael acceptor double-bonds, and the nucleophile monomer contains two primary amine functional groups, wherein the electrophile monomer may have the structure:

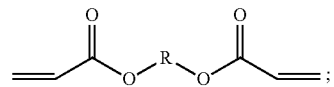

wherein R represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, —$OR^A$ where $R^A$ represents $C_{1-6}$alkyl; and each of the alkyl, alkenyl and alkynyl moieties may be linear, branched or cyclic;

and the nucleophile monomer has the structure $NH_2R'NH_2$, wherein R' represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{6-10}$aryl, or 5 or 6-membered heteroaryl; wherein each of the foregoing groups may be optionally substituted with halogen, —CN, $C_{1-6}$alkyl, —$OR'^A$ where $R'^A$ represents $C_{1-6}$alkyl; and each of the alkyl, alkenyl and alkynyl moieties may be linear, branched or cyclic.

For example R may represent $C_{1-20}$alkyl, $C_{1-20}$heteroalkyl, $C_{7-20}$aralkyl, $C_{1-20}$heteroalkyl$C_{6-10}$aryl or $C_{6-10}$aryl; wherein each of the foregoing groups may be optionally substituted with $C_{1-6}$alkyl, $C_{6-10}$aryl, —$OR^A$ where $R^A$ represents $C_{1-6}$alkyl; and each of the alkyl moieties may be linear, branched or cyclic;

and R' may represent $C_{1-20}$alkyl, $C_{1-20}$heteroalkyl, $C_{7-20}$aralkyl or $C_{6-10}$aryl; wherein each of the foregoing groups may be optionally substituted with $C_{1-6}$alkyl, —$OR'^A$ where $R'^A$ represents $C_{1-6}$alkyl; and each of the alkyl moieties may be linear, branched or cyclic.

Advantageously, in the initial polymerization reaction mixture (step (i)), the ratio (Michael acceptor double-bonds of the electrophile monomer)/(primary amine functional groups of the nucleophile monomer) may range from 1.1/1 to 100/1, more preferably the ratio may be 1.5/1 to 20/1; most preferably the ratio may be 2/1 to 10/1.

Advantageously, the light source used in step ii) may be a UV or visible light source, such as LED, arc lamp, incandescence lamp or natural light. As discussed previously, advantageously, irradiation step ii) is carried out when step i) is substantially complete. Advantageously, step ii) is carried out in the presence of a photoinitiator. Any photoinitiator conventionally used in the art may be used. For example, the photoinitiator may be selected from:

Type I free radical photoinitiators
from the family of acetophenones, alkoxyacetophenones and derivatives, such as 2,2-dimethoxy-2-phenyleacetophenone and 2,2-diethyl-2-phenylacetophenone;
from the family of hydroxyacetophenones and derivatives, such as 2,2-dimethyl-2-hydroxyacetophenone, 1-hydroxycyclohexylehenyle cetone, 2-hydroxy-4'-(2-hydroxyethoxy)-2-methyl-propriophenone and 2-hydroxy-4'-(2-hydroxypropoxy)-2-methyl-propriophenone;
from the family of alkylaminoacetophenones and derivatives, such as 2-methyl-4'-(methylthio)-2-morpholino-propriophenone, 2-benzyl-2-(dimethylamino)-4-morpholino-butyrophenone and 2-(4-(methylbenzyl)-2-(dimethylamino)-4-morpholino-butyrophenone;
from the family of benzoin ethers and derivatives, such as benzoin benzyl-, methyl- and isopropyl-ethers;
from the family of phosphine oxides and derivatives, such as diphenyl-(2,4,6-trimethylbenzoyl)phosphine oxide (TPO), ethyl-(2,4,6-trimethylbenzoyl)phenylphosphine oxide (TPO-L) and bis-(2,6-dimethoxybenzoyl)-2,4,4-trimethylphenyle phosphine oxide (BAPO);

Type II free radical photoinitiators
from the family of benzophenones and derivatives, such as 4-phenylbenzophenone, 4-(4'methylphenylthio)benzophenone, 1-[4-[(4-benzoylphenyl)thio]phenyl]-2-methyl-2-[(4-methylphenyl)sulfonyl]-1-propanone;
from the family of thioxanthones and derivatives, such as isopropylthioxanthone (ITX), 2,4-diethylthioxanthone, 2,4-dimethylthioxantone, 2-chlorothioxanthone and 1-chloro-4-isopropylthioxanthone;
from the family of quinones and derivatives, such as antraquinones including 2-ethylantraquinone and camphroquinones;
from the family of benzoyl formate esters and derivatives, such as methylbenzoylformate;
from the family of metallocenes and derivatives, such as ferrocene, titanium bis(eta 5-2,4-cyclopentadien-1-yl)-bis(2,6-difluoro)-3-(1H-pyrrol-1-yl)-phenyl) and iron (cumene)cyclopentadienyl hexafluorophosphate;
from the family of dibenzylidene ketones and derivatives, such as p-dimethylaminoketone;
from the family of coumarines and derivatives, such as 5-methoxy coumarine, 7-methoxy coumarine, 7-diethylamino coumarine and N-phenylglycin coumarine';
photinitiators from the family of dyes such as triazines and derivatives, fluorones and derivatives, cyanines and derivatives, safranines and derivatives, 4,5,6,7-tetrachloro-3',6'-dihydroxy-2',4',5',7'-tetraiodo-3H-spiro[isobenzofuran-1,9'-xanthen]-3-one, pyrylium or thiopyrylium and derivatives, thiazines and derivatives, flavines and derivatives, pyronines and derivatives, oxazines and derivatives, rhodamines and derivatives;
a mixture of at least two of the aforementioned photoinitiators.

Advantageously, the method according to this first aspect of the invention may carried out in the absence of a catalyst and the electrophile monomer has the structure:

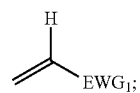

wherein $EWG_1$ represents

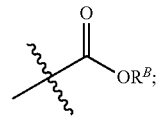

wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, or —$OR^{B1}$ where $R^{B1}$ represents $C_{1-6}$alkyl; and each of the alkyl, alkenyl and alkynyl moieties may be linear, branched or cyclic; preferably, $R^B$ may represent $C_{1-20}$alkyl, $C_{1-20}$heteroalkyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with $C_{1-6}$alkyl, $C_{6-10}$aryl, or —$OR^{B1}$ where $R^{B1}$ represents $C_{1-6}$alkyl; and each of the alkyl moieties may be linear, branched or cyclic; more preferably $R^B$ represents a linear, branched or cyclic $C_{1-6}$alkyl moiety or a $C_{6-10}$aryl moiety;

wherein $R^B$ may further bear one or more acryl or methacryl groups:

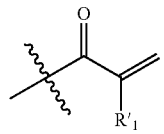

wherein R'1 represents H or methyl, preferably H; more preferably $R^B$ may further bear one or more acrylate or methacrylate groups, most preferably acrylate groups.

Advantageously, the electrophile and nucleophile monomers are liquid at room temperature, so that the process is carried out at room temperature in the absence of solvent. This solvent-free variant is particularly advantageous as it responds to ever-increasing demands for environmentally-friendly and cost efficient processes.

If one of the electrophile or nucleophile monomer is solid at room temperature a solvent may be used throughout the process. Any solvent conventionally used in polymer chemistry may be used. Typical solvents for the Aza-Michael reaction include methanol, ethanol, cresol, m-cresol, diethyl ether, tetrahydrofuran, benzene, xylene, toluene, dioxane, water, trifluoroethanol (TFE), hexafluoroisopropyl alcohol (HFIP), acetonitrile, 1,2-Dichloroethane, dichloromethane, poly(ethylene glycol), Dimethylformamide, 1-Butyl-3-methylimidazolium hexafluorophosphate, 1-Butyl-3-methylimidazolium tetrafluoroborate, 2-propanol (iPrOH) ±2H$_2$O, Tetra-n-butylammonium bromide, dimethylsulfoxide, acetic acid, Dimethylacetamide, mixtures of two or more of these solvents.

Advantageously, step iii) is carried out without additional energy or processing step other than letting the secondary aza-Michael addition reaction proceed at room temperature, thereby allowing the polymer product to spontaneously consolidate.

In a second aspect, there is provided a dual cure polymerization process for preparing interpenetrating polymer networks ("IPN"), including:
  i) providing a mixture including:
    an electrophile monomer (I) having the structure:

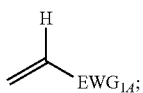
(I)

an electrophile monomer (II) having the structure:

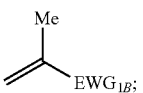
(II)

wherein EWG$_{1A}$ and EWG$_{1B}$ independently represent an electron withdrawing group optionally containing one or more additional Michael acceptor double-bonds and/or radically polymerizable double bonds;
    a nucleophile monomer, R$_{3A}$—NH—R$_{3B}$, bearing a primary or secondary amine functional group wherein R$_{3A}$ represents C$_{1-20}$alkyl, C$_{2-20}$alkenyl, C$_{2-20}$alkynyl, C$_{1-20}$heteroalkyl, C$_{2-20}$heteroalkenyl, C$_{2-20}$heteroalkynyl, C$_{7-20}$aralkyl, C$_{6-10}$aryl, or 5 or 6-membered heteroaryl; R$_{3B}$ represents H, C$_{1-20}$alkyl, C$_{2-20}$alkenyl, C$_{2-20}$alkynyl, C$_{1-20}$heteroalkyl, C$_{2-20}$heteroalkenyl, C$_{2-20}$heteroalkynyl, C$_{7-20}$aralkyl, C$_{6-10}$aryl, or 5 or 6-membered heteroaryl; wherein each of the foregoing groups may be optionally substituted with —NH$_2$, halogen, —CN, C$_{1-6}$alkyl, —C(=O)OR$^{2A}$ where represents C$_{1-6}$alkyl or C$_{6-10}$aryl, or —OR$^{2B}$ where R$^{2B}$ represents H, C$_{1-6}$alkyl or C$_{6-10}$aryl optionally further substituted with —NH$_2$; and each of the alkyl, alkenyl and alkynyl moieties may be linear, branched or cyclic;
      wherein the Michael acceptor double-bonds of the electrophile monomer (I) are in stoichiometric amount relative to the primary amine functional groups of the nucleophile monomer;
      and wherein the electrophile monomer (II) is unreactive towards Michael addition of the nucleophile monomer;
  (ii) allowing the nucleophile monomer to undergo Michael addition with the electrophile monomer (I) under suitable conditions thereby forming a first Michael adduct (IA) having the structure:

(I$^A$)

and
  (iii) subjecting the product obtained in step ii) to a suitable light source to effect photopolymerization of monomer (II), thereby forming an interpenetrating polymer network.

All the embodiments described above for the first aspect of the invention, with respect to:
  the electrowithdrawing groups;
  the presence of optional additional Michael acceptor double-bonds and/or radically polymerizable double bonds on electrowithdrawing group EWG1;
  the acrylate monomers that may be used
  the primary amines that may be used as nucleophile monomer;
  embodiments where the electrophile monomer contains one Michael acceptor double-bonds, and the nucleophile monomer contains one amine functional groups
  embodiments where the electrophile monomer contains two Michael acceptor double-bonds, and the nucleophile monomer contains two amine functional groups
  the type of light source that may be used
  the type of photoinitiator that may be used
  the optional presence of a catalyst, and the type of catalyst that may be used
  the working temperature (room temperature)
  the optional used of a solvent, for example when one of the electrophile or amine monomer is solid at room temperature are applicable mutatis mutandis to this second aspect of the invention, and are not repeated here for conciseness.

Advantageously, EWG$_1$ and EWG$_2$ independently may represent:

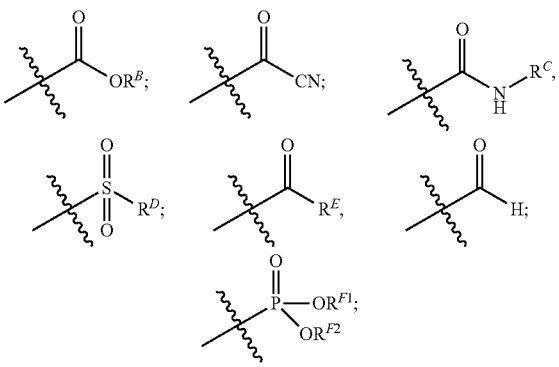

wherein R$^B$, R$^C$, R$^D$, R$^E$, R$^{F1}$ and R$^{F2}$ are as defined in claim 2;

wherein each of the R$^B$, R$^C$, R$^D$, R$^E$, R$^{F1}$ and R$^{F2}$ substituents may further bear one or more acryl or methacryl groups:

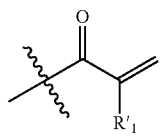

wherein R'1 represents H or methyl, preferably H; more preferably each of the $R^B$, $R^C$, $R^D$, $R^E$, $R^{F1}$ and $R^{F2}$ substituents may further bear one or more acrylate or methacrylate groups, most preferably acrylate groups.

Advantageously, the electrophile monomer (I) may be an acrylate monomer having the structure:

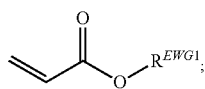

and electrophile monomer (II) is a methacrylate monomer having the structure:

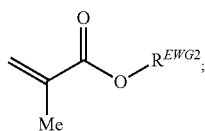

wherein $R^{EWG1}$ and $R^{EWG2}$ independently represent $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be optionally substituted with halogen, —CN, $C_{1-6}$alkyl, $C_{6-10}$aryl, —$OR^{2A}$ where $R^{2A}$ represents $C_{1-6}$alkyl; and each of the alkyl, alkenyl and alkynyl moieties may be linear, branched or cyclic; wherein $R^{EWG1}$ may further bear one or more acrylate groups and $R^{EWG2}$ may further bear one or more methacrylate groups.

The methacrylate monomer (II) may be any suitable methacrylate monomer conventionally used in the art. For example, methacrylate monomer (II) may be a methacrylate monomer, a urethane methacrylate monomer, or an epoxy methacrylate monomer. Such methacrylate resins are commercially available, for example from Sartomer, or Allnex (under the commercial name Ebecryl®):

As examples of methacrylate monomers, we may mention:
Monofunctional Methacrylate Monomers Such As
Tetrahydrofurfuryl methacrylate (THFMA) SR03H®
Methylmethacrylate (MMA)
Tertiobutyl cyclohexanol methacrylate (TBCHMA) SR218®
Isodecyl methacrylate (IDMA) SR242®
C12 alkyl methacrylate (Lauryl methacrylate) SR313A®
C12/C14 alkyl methacrylate SR313E®
C12/C15 alkyl methacrylate SR314®
C16/C18 alkyl methacrylate SR324®
2-phenoxyethyl methacrylate (2-PEMA) SR340®
Ethoxylated 4 phenyl methacrylate (P4EOMA) SR411®
3,3,5 trimethyl cyclohexanol methacrylate (TMCHMA) SR421A®
Isotridecyl methacrylate (ITDMA) SR493®
Methoxy polyethylene glycol (350) methacrylate (MPEG350MA) SR550®
Ethoxylated 25 C22 methacrylate (Ethoxylated Behenyl MA) SR567P®
Polypropylene glycol monomethacrylate (PPGMA) SR604®
Ethyl triglycol methacrylate (ETMA) SR730®
Bifunctional methacrylate monomers such as
Triethylene glycol dimethacrylate (TiEGDMA) SR205H®
Ethylene glycol dimethacrylate (EGDMA) SR206H®
Tetraethylene glycol dimethacrylate (TTEGDMA) SR209®
Polyethylene glycol (200) dimethacrylate (PEG200DMA) SR210HH®
1,4-butanediol dimethacrylate (BDDMA) SR214®
Diethylene glycol dimethacrylate (DEGDMA) SR231®
1,6-hexanediol dimethacrylate (HDDMA) SR239A®
Polyethylene glycol (600) dimethacrylate (PEG600DMA) SR252®
1,12-dodecanediol dimethacrylate (DDDDMA) SR262®
1,3-butylene glycol dimethacrylate (BGDMA) SR297J®
Ethoxylated 3 bisphenol A dimethacrylate (BPA3EODMA) SR348C®
Ethoxylated 2 bisphenol A dimethacrylate (BPA2EODMA) SR348L®
Ethoxylated 10 bisphenol A dimethacrylate (BPA10EODMA) SR480®
Ethoxylated 4 bisphenol A dimethacrylate (BPA4EODMA) SR540®
Tricyclodecanedimethanol dimethacrylate (TCDDM-DMA) SR834®
Trifunctional methacrylate monomers such as
Trimethylolpropane trimethacrylate (TMPTMA) SR350D®
Tetrafunctional methacrylate monomers such as
Alkoxylated pentaerythritol tetramethacrylate (PETTMA) SR596®

As examples of urethane methacrylate monomers, we may mention bifunctional urethane methacrylate monomers such as CN1963®.

As examples of epoxy methacrylate monomers, we may mention bifunctional epoxy methacrylate monomers such as CN159®.

The nucleophilic monomer $R_{3A}$—NH—$R_{3B}$ may be any compound bearing a primary or secondary amine functional group. Preferably, the nucleophilic monomer may not contain functional groups that may be more reactive towards the Michael acceptor double-bonds present on the electrophile monomer than primary or secondary amines, so as not to compete with the Aza-Michael reaction. As such, the nucleophilic monomer may contain —OH or —SH functional groups which are less reactive than primary or secondary amine functional groups towards Michael addition.

The nucleophilic monomer $R_{3A}$—NH—$R_{3B}$ may be any of the primary amines described above for the first variant of the invention.

The nucleophilic monomer $R_{3A}$—NH—$R_{3B}$ may be an aliphatic, cyclo-aliphatic or aromatic secondary amine. Examples include: N,N'-Dimethyl-1,6-hexanediamine, N,N'-Diethyl-2-butene-1,4-diamine, N,N'-Diisopropylethylenediamine, N,N'-Diisopropyl-1,3-propanediamine, N,N'-Dimethyl-1,3-propanediamine, N,N'-Diphenyl-p-phenylenediamine, 1,4,8,12-Tetraazacyclopentadecane.

Embodiments common to both aspects of the invention described above:

Advantageously, the method according to the invention can generally be carried out using conventional methods of mixing the above described components in a suitable mixing device such as, but not limited to, stirred tanks, dissolvers, homogenizers, microfluidizers, extruders, or other equipment conventionally used in the field.

When the method of the invention are used in the preparation of composites and/or laminated articles, the process may further include a step of adding a material/reinforcement designed for this purpose using known methods.

Advantageously, the method further includes a step of impregnating composite reinforcements with the material obtained in step (i) in a mold, such as a silicone mold, prior to the application of light source.

Advantageously, the composite reinforcements may be any reinforcing conventionally used in the manufacture and implementation of composite materials. For example, the composite reinforcements may be selected from:

Glass fibers
Carbon fibers
Aramid fibers (Kevlar®)
Basalt fibers
Silica fibers
Silicon carbide fibers
Polymer fibers
Vegetal fibers (hemp, flax . . . )
Mineral, metallic or organic fillers (for example gravel, sand, glass beads, carbonate powder, alumina hydrate powder, steel powder, aluminum powder, polymer particles, titanium oxide, alumina, etc. . . . )

Advantageously, the composite reinforcements may be selected from glass fibers, carbon fibers, aramid fibers, basalt fibers, silica fibers, polymer fibers (such as polyesters, poly (p-phenylene-2,6-benzobisoxazole), aliphatic and aromatic polyamides, polyethylene, polymethyl methacrylate, polytetrafluoroethylene), natural fibers (such as nettle, flax or hemp fibers) . . .

Advantageously, the composite reinforcements may be previously disposed in a mold, and then impregnated by the composition obtained in step (i), before application of light radiation (step (ii)).

Alternatively, composite reinforcements may be pre-impregnated with the composition obtained in step (i). Then the mixture may be deposited/spread evenly over the mold, either manually or using an automated robot, in the case of mass production.

The process may further include a step of adding any other additive conventionally used in the field of resins, composite materials and applications. Examples of suitable additives include:

pigments, such as colored pigments, fluorescent pigments, electrically conductive pigments, magnetically shielding pigments, metal powders, scratch-proofing pigments, organic dyes or mixtures thereof;
light stabilizers such as benzotriazoles or oxalanilides
crosslinking catalysts such as dibutyltin dilaurate or lithium decanoate;
slip additives;
defoamers;
emulsifiers, especially nonionic emulsifiers such as alkoxylated alkanols and polyols, phenols and alkylphenols or anionic emulsifiers, such as alkali metal salts or ammonium salts of alkanecarboxylic acids, alkanesulfonic acids, alkanol sulfonic acids or alkoxylated polyols, phenols or alkyl phenols;
wetting agents such as siloxanes, fluorinated compounds, carboxylic monoesters, phosphoric esters, polyacrylic acids or their copolymers, polyurethanes or acrylate copolymers, which are commercially available under the trademark MODAFLOW® or DISPERLON®;
adhesion promoters such as tricyclodecan-dimethanol;
leveling agents:
film-forming adjuvants such as cellulose derivatives;
flame retardants;
sag control agents such as ureas, modified ureas and/or silicas,
rheology control additives such as those described in patent documents WO 94/22968 [1], EP0276501A1 [2], EP0249201A1 [3], and WO 97/12945 [4];
crosslinked polymeric microparticles, as described for example in EP0008127A1 [5];
inorganic phyllosilicates such as aluminum magnesium silicate, magnesium sodium silicates or magnesium fluoride sodium lithium phyllosilicates of montmorillonite type;
silicas such as Aerosils® silicas;
flatting agents such as magnesium stearate; and/or
tackifiers.

Mixtures of at least two of these additives are also suitable in the context of the invention.

As used herein, the term "tackifier" refers to polymers which increase the tack properties, that is to say, the intrinsic viscosity or self-adhesion, the compositions so that, after a slight pressure a short period, they adhere firmly to surfaces.

In another aspect, the invention provides articles obtainable by a polymerization process according to any one variant of the inventive method, as described above.

In yet another aspect, there is provided the use a polymerization process according to the invention in the manufacture of shape-memory polymer articles. Advantageously, the shape-memory polymer articles may be a composite, a wound-healing material/article, or an anti-scratch coating material.

The present invention offers many advantages, including:
Preparation of a resin for the production of a polymer material/composition in several distinct steps, allowing full control at each step. As such, the properties of the resin can be controlled throughout the manufacturing of the material and can be adapted to different process steps depending on the desired material. The viscosity of the resin can thus be controlled in a first step to have a desired consistency for application by a particular deposition process. In a second step, the deposited product is fully crosslinked photochemically. Then, a post-consolidation at room temperature can take place without additional intervention (no additional energy input or operation).
The process is applicable to the broad field of adhesive material chemistry, glue, composite materials
flexibility of the process (speed and resins suitable properties for the desired stages)
versatility of properties obtained (thermoset, thermoplastic, IPN . . . )
access to new thermomechanical properties of the polymer materials/compositions
cost efficiency (the process can be carried out at room temperature)
environmentally friendly (no solvent necessary, with adequately selected starting materials+step (i) performed at room temperature by "click chemistry"))

Other advantages may also emerge to those skilled in the art upon reading the examples below, with reference to the attached figures, which are provided as nonlimiting illustrations.

EQUIVALENTS

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

The following examples contain important additional information, exemplification and guidance that can be adapted to the practice of this invention in its various embodiments and the equivalents thereof.

EXEMPLIFICATION

The polymer materials/compositions of this invention and their preparation can be understood further by the examples that illustrate some of the processes by which these polymer materials/compositions are prepared or used. It will be appreciated, however, that these examples do not limit the invention. Variations of the invention, now known or further developed, are considered to fall within the scope of the present invention as described herein and as hereinafter claimed.

Materials

Figure 2:
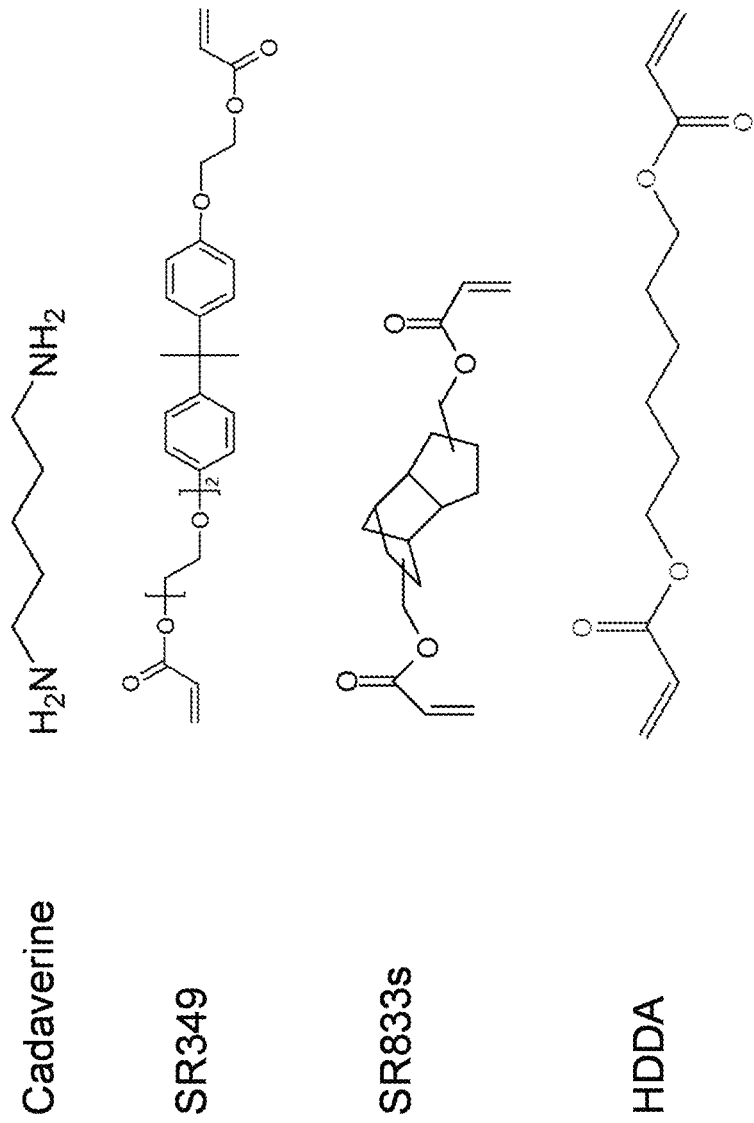
FIG. 2 represents chemical structures of the starting materials used in the Examples.

The starting materials used in the Examples are depicted in FIG. 2.

Ethoxylated Bisphenol A Diacrylate ("EBAD", also referred to as SR349®) was obtained from Sartomer, Irgacure 819® was procured from BASF. 1,5-diaminopentane ("DP", cadaverine) was purchased from Sigma Aldrich.

Comparative Example 1

For standard Aza-Michael polymerization, the electrophile monomer (e.g., EBAD) was added to the nucleophile monomer (e.g., DP) and mixed vigorously in a pillbox.

Example 1—Three Stage Polymerization System (Cadaverine+EBAD)

Three stage polymerization with feed molar ratio of 1:4.2 has been studied by RT-FTIR, DSC, NMR and DMA. Briefly, Irgacure 819® (2.5 wt %) was first added to the acrylate and then, the mixture was mixed with DP in a pillbox.

After a given reaction time, the mixture was:
- spread between two polypropylene films and laminated between two CaF2 pellets (film thickness: 50 μm). Laminated samples were finally cured using a Roithner LaserTechnik LED395-66-60-110 (395 nm) at 70 mW/cm² (FTIR and DSC data),
- spread onto a polypropylene film (film thickness: 70 μm), samples were finally cured using a LED (395 nm) onto a conveyor belt with a dose of 7 J/cm² (DMA data).

Differential Scanning Calorimetry (DSC)

Thermal properties of the different components were evaluated using Q200 from TA Instruments. Products were placed in hermetically sealed aluminium pans (between 5 and 10 mg) and heated from −80 to 30° C. for stage 1 characterization, from −40 to 40° C. for stage 2 characterization and from −20 to 70° C. for stage 2 characterization (10° C. min⁻¹ ramp).

Real Time Fourier Transform Infrared Spectroscopy (RT-FTIR)

Formulations, applied on polypropylene, were studied by RT-FTIR; their reactivity was monitored under light intensity control. In order to avoid any error due to eventual thickness variations, samples were laminated between two $CaF_2$ pellets using a Teflon spacer. The photopolymerizations were followed using a Vertex 70 FT-IR spectrophotometer from Bruker Optics settled in a "Rapid Scan" mode and fitted with a MCT detector. Spectra were recorded with a time resolution of 0.261 s and with a 4 cm⁻¹ spectral resolution. The in situ IR analysis was performed in transmission configuration, simultaneously with LED irradiation triggering the polymerization process. Disappearance of the acrylate double bonds at 1640 cm⁻¹ (stretching of C=C) was followed vs. irradiation time. Conversion of double bonds was then calculated according to 10 and plotted vs. irradiation time:

$$\text{Acrylate conversion (\%)} = \left(1 - \frac{A_t^{1640}}{A_0^{1640}}\right) \times 100 \qquad 10$$

Dynamic Mechanical Analysis (DMA)

Figure 3:
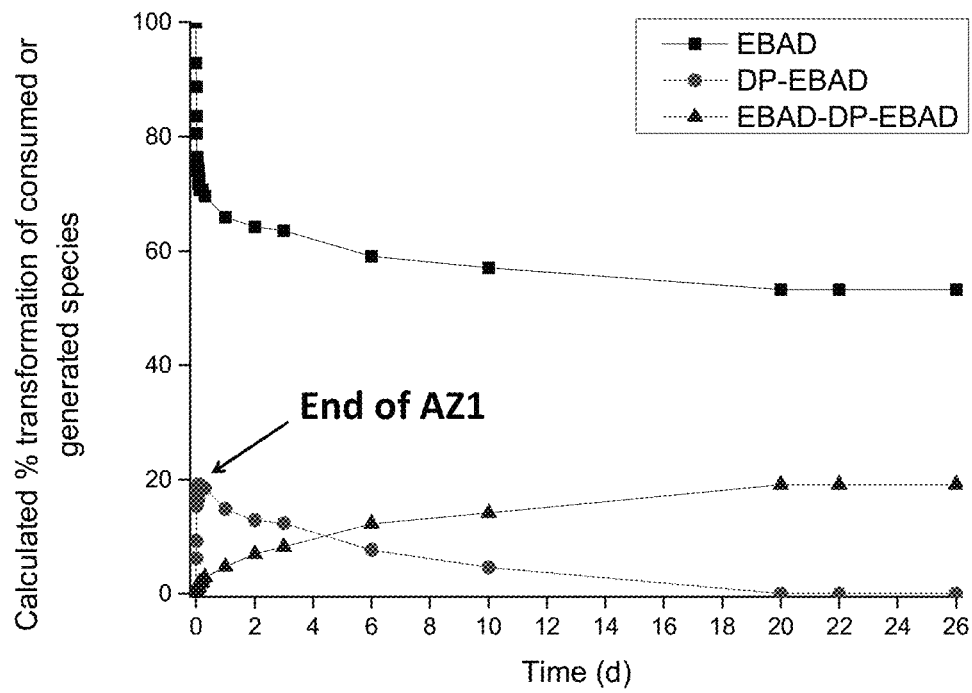
FIG. 3 represents in-situ monitoring of reaction progress based on NMR calculated % transformation of the different species consumed or generated at different polymerization stage (reactants and products of Example 1).
Figure 4:
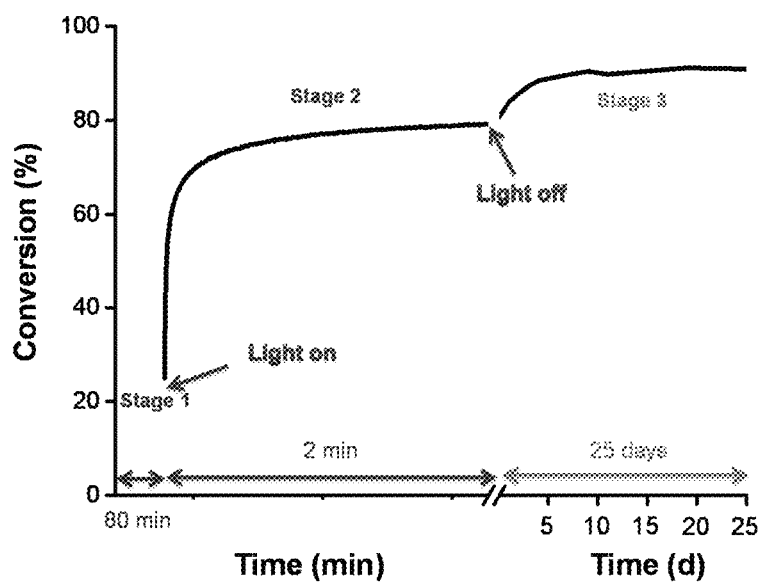
FIG. 4 represents EBAD conversion kinetics of the three stage process of Example 1.

The dynamic thermo-mechanical properties of the UV-cured materials were investigated with a Q800 DMA (TA Instruments) in the tensile configuration. The samples were rectangular (12.8*5.3*0.070 mm) free films removed from polypropylene substrates. Temperatures ranged from −20 to 100° C. (example 1) and −20 to 140° C. (example 2) and the heating rate was set at 2° C./min. The amplitude and frequency of the oscillatory deformations were adjusted to 15 μm and 1 Hz, respectively Results and Discussion:

NMR calculated % transformation of the different species consumed or generated at different polymerization stage are displayed in FIG. 3 and Table 1. Polymer glass transition temperature (Tg) and EBAD conversion are shown in Table 2. Kinetic of EBAD-conversion during Stage 2 and Stage 3 is displayed in FIG. 4. Stage 1 polymer exhibits a low Tg of −31° C. and a EBAD-conversion of 19%. Photopolymerization of residual acrylates enabled stage 2 to increase Tg and EBAD-conversion. Indeed, a significant increase in both Tg (16° C.) and EBAD-conversion (79%) during stage 2 (photo-curing stage) was observed, in contrast to the first stage. Furthermore, it is possible to tune properties observed during second stage curing by changing the amount of remaining acrylate groups after stage 1.

TABLE 1

| | Time | EBAD (%) | DP-EBAD (%) | EBAD-DP-EBAD (%) |
|---|---|---|---|---|
| min | 0 | 100.0 | 0.0 | 0.0 |
| | 1 | 92.8 | 6.2 | 0.0 |
| | 10 | 88.7 | 9.2 | 0.3 |
| | 20 | 83.6 | 15.4 | 0.3 |
| | 30 | 80.5 | 17.4 | 1.0 |
| | 40 | 75.1 | 16.4 | 1.2 |
| | 50 | 76.5 | 17.4 | 1.2 |
| | 60 | 74.1 | 17.4 | 1.2 |
| | 70 | 74.4 | 17.4 | 1.0 |
| | 80 | 74.4 | 19.0 | 1.2 |
| | 120 | 71.7 | 19.0 | 1.7 |

TABLE 1-continued

| | Time | EBAD (%) | DP-EBAD (%) | EBAD-DP-EBAD (%) |
|---|---|---|---|---|
| | 150 | 72.7 | 19.0 | 1.9 |
| | 180 | 70.6 | 19.0 | 1.9 |
| h | 5 | 70.6 | 18.5 | 2.0 |
| | 7 | 69.6 | 18.5 | 2.9 |
| J | 1 | 65.9 | 14.9 | 4.8 |
| | 2 | 64.2 | 12.8 | 7.0 |
| | 3 | 63.5 | 12.3 | 8.2 |
| | 6 | 59.0 | 7.7 | 12.3 |
| | 10 | 58.0 | 4.6 | 14.2 |
| | 20 | 53.2 | 0 | 19.1 |
| | 22 | 53.2 | 0 | 19.1 |
| | 26 | 53.2 | 0 | 19.1 |

However, due to vitrification it was impossible to reach 100% conversion at the end of stage 2. Indeed, during the photo-curing reaction, the glass transition temperature of the polymer increases very quickly. This leads to a vitrification of the system and finally to a limitation of the conversion, due to restricted mobility. [8, 9] It is then difficult for the second stage to reach the highest Tg. That is what this stage 3 is all about. Without prior energy input, the conversion and Tg of the formed polymer increased with time. At the end of stage 3 (10 days), the polymer achieves a Tg of 39° C. and a EBA D-conversion of 91%. One of the advantages of this three stage polymerization resides in the fact that stage 3 preserves the ability to polymerize in a vitrified media. Vitrification problem taking place in standard photopolymerization is not a limiting factor anymore. This crosslinking is, otherwise, controllable according to the initial ratio and the conversion obtained after stage 2.

Figure 5:
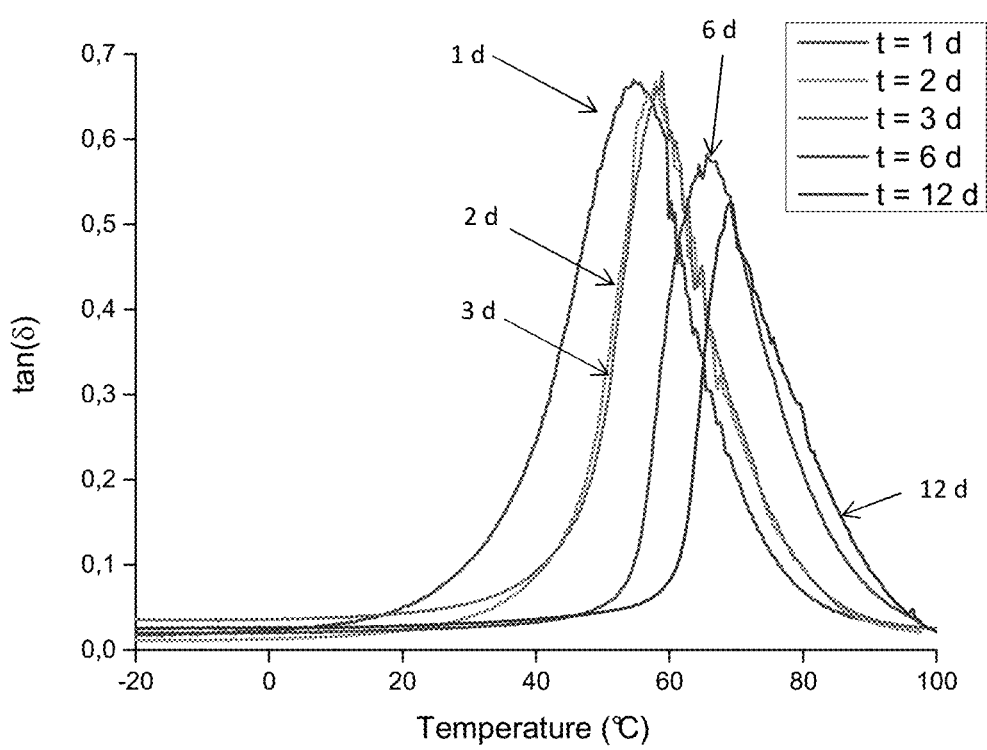
FIG. 5 represents the evolution of thermomechanical properties of the film obtained after Stage 2 and at different polymerization time of stage 3 (Example 1).

This exemplifies a polymer system that is formed by three reactions capable of generating distinct first, second and three stage polymers (cf. FIG. 1). The first stage takes advantage from the powerful click reaction called AZ1 that is orthogonal to the desired second stage reaction. The AZ1 reaction forms a quasi-linear polymer the properties of which can be tuned by changing backbones, functionality of acrylate and/or amine. By bringing this reaction to an off-stoichiometric state, reactive acrylate moieties will be present in the media at the end of stage one. Stage 2 is a photopolymerization step which is carried out in a particular window-time (between end of AZ1 and beginning of AZ2). In the presence of a photoinitiator and light, the remaining acrylic moieties polymerize to increase the crosslink density, as well as the mechanical properties.[11-13] In stage 3, the AZ2 reaction takes over and reaches a nearly total conversion. Indeed, by allowing sufficient time to finish the global aza-Michael reaction, it is possible to perform AZ2 in a rigid media. This third reaction acts as another way to crosslink the material and helps to reach a higher conversion and a more homogeneous network. Indeed, FIG. 5 shows a decrease of the tan(δ) peak width during Stage 3.

To further show the interest and the relevance of the method of the invention, the optimal three-stage system was compared with a two-stage system (AZ1+AZ2) and two three-stage systems: AZ1+AZ2+hv, and AZ1+hv(50)+AZ2 (Table 2). Comparative acrylate-conversion and Tg obtained when changing the order of the photopolymerization step are gathered in Table 3.

TABLE 2

| | Stage 1 | | Stage 2 | | Stage 3 | |
|---|---|---|---|---|---|---|
| | Conv (%) | Tg (° C.) | Conv (%) | Tg (° C.) | Conv (%) | Tg (° C.) |
| 1:4 | 19 | −31 | 78 | 16 | 91 | 39 |

TABLE 3

| | Stage 1 | | Stage 2 | | Stage 3 | | (Stage 4) | |
|---|---|---|---|---|---|---|---|---|
| | Conv (%) | Tg (° C.) | Conv (%) | Tg (° C.) | Conv (%) | Tg (° C.) | Conv (%) | Tg (° C.) |
| $AZ_1 + AZ_2$ | 25 | −31 | 50 | −11 | | | | |
| $AZ_1 + AZ_2$ + hv | 25 | −31 | 50 | −11 | 78 | 16 | | |
| $AZ_1$ + hv(75) + $AZ_2$ | 25 | −31 | 78 | 16 | 91 | 39 | | |
| $AZ_1$ + hv(50) + $AZ_2$ (+hv) | 25 | −31 | 53 | −16 | 76 | 9 | 78 | 16 |

The comparison with the two-stage system clearly shows the advantage of adding a third step to improve mechanical properties. The study of the AZ1+AZ2+hv system highlights the importance of the order of steps. By performing the photopolymerization after the reactions AZ1 and AZ2, the mechanical properties obtained are decreased (Tg=16° C.).

As for the comparison with the system AZ1+hv (50)+AZ2, it shows the importance of pushing photopolymerization at its maximum. Indeed, by reducing the rate of conversion of acrylate to 50% after the photopolymerization, the Tg obtained after the three steps is only 9° C.

In conclusion, the improved Tg and the highest conversion rates were obtained with the method according to the invention.

Example 2—Three Stage Polymerization System (Cadaverine+SR833s®)

Figure 6:
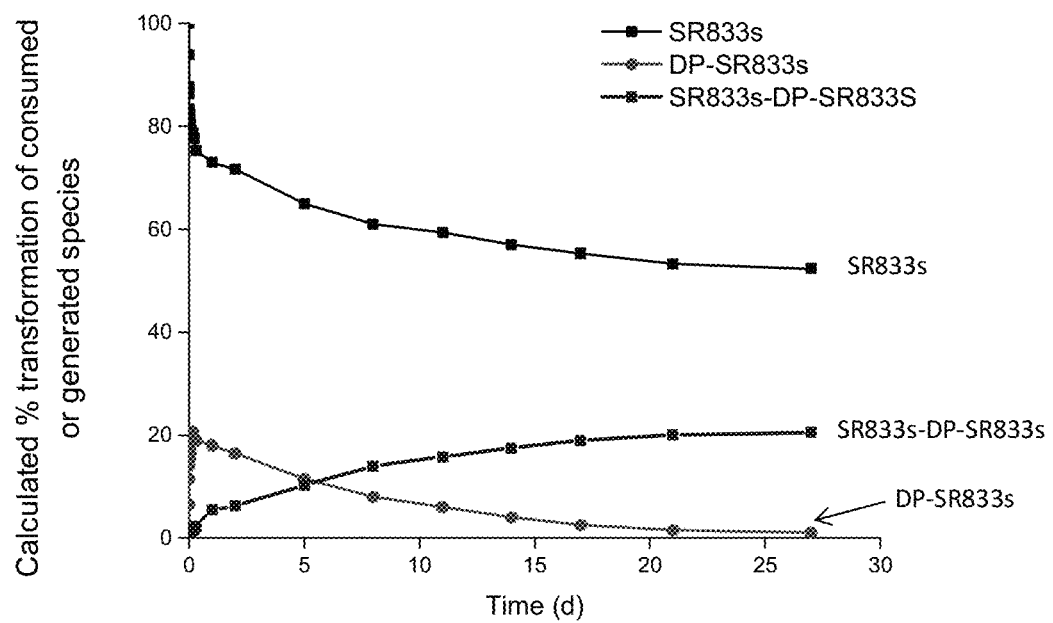
FIG. 6 represents in-situ monitoring of reaction progress based on NMR calculated % transformation of the different species consumed or generated (SR833s, DP-SR833s and SR833s-DP-SR833s) at different polymerization stage (Example 2). Ratio cadaverine/SR833S 1:4.

The same reaction protocol as Example 1 was used, replacing EBAD (SR349®) with SR833s (DP/SR833S ratio 1:4). Three stage polymerization with feed molar ratio of 1:4 has been studied by NMR and DMA. Briefly, Irgacure 819® (2.5 wt %) was first added to the acrylate and then, the mixture was mixed with DP in a pillbox. After a determined reaction time, the mixture was both spread onto a polypropylene film (film thickness: 70 μm), samples were finally cured using a LED (395 nm) onto a conveyor belt with a dose of 7 J/cm2 (DMA data), Similar results to Example 1 were obtained. (FIG. 6, and Table 4).

TABLE 4

| Time (d) | Tg (° C.) = max (Tan(δ)) |
|---|---|
| 0 | 92 |
| 3 | 99 |
| 7 | 100 |
| 13 | 101 |
| 25 | 101 |

Example 3—Three Stage Polymerization System (Cadaverine+HDDA)

The same reaction protocol as Example 1 is used, replacing EBAD (SR349®) with HDDA. Similar results to Example 1 are obtained.

Comparative Example 4—AZ1+AZ2 Polymerization System: (Hexylamine+EBAD) vs. (DP+EBAD)

Figure 7:
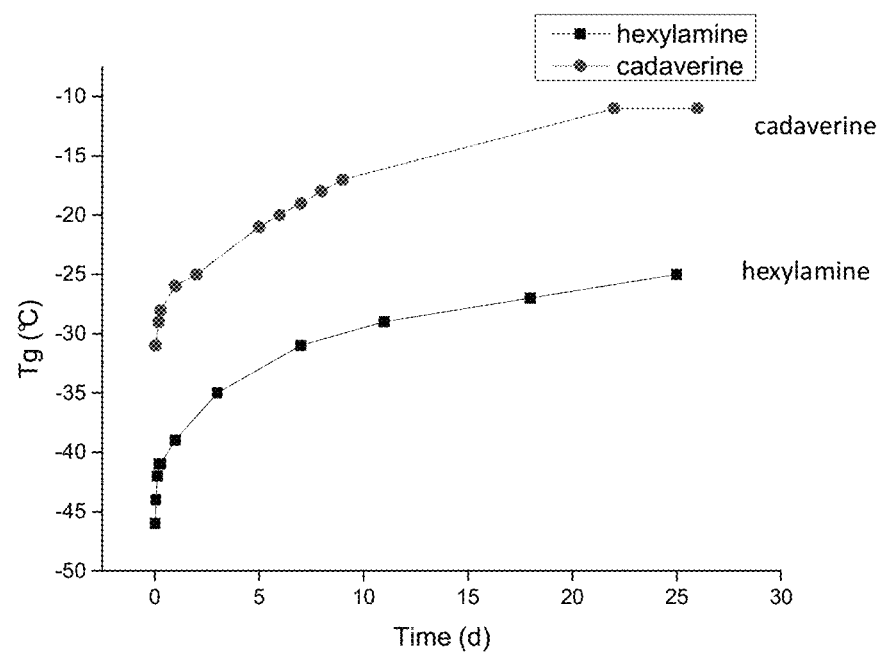
FIG. 7 represents comparative DSC monitoring of Tg's at different polymerization stage for the AZ1+AZ2 polymerization systems of comparative Example 4.

The same reaction protocol as comparative Example 1 was used, using DP (DP/EBAD ratio 1:4). or hexylamine (hexylamine/EBAD ratio 1:4) as nucleophile monomer. The Tg's obtained after AZ1 and AZ2 with a monoamine are much lower than a diamine, which is to be expected (less crosslinking in the polymer network). (FIG. 7)

Example 5A—IPN (DP+EBAD+SR348C®)

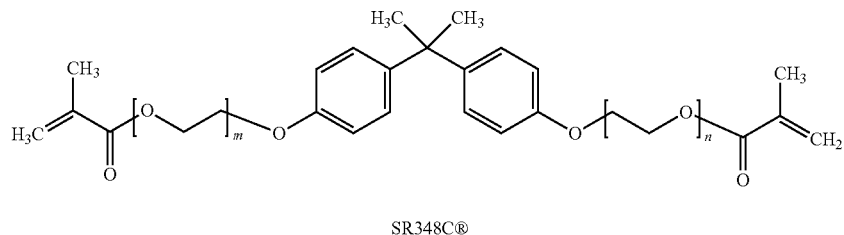

SR348C®

IPN network formation has been studied by RT-FTIR, DSC and DMA. Briefly, Irgacure 819® (2.5 wt %) was first added to the acrylate and/or methacrylate and then, the mixture (acrylate+methacrylate+irgacure819®) was mixed with DP in a pillbox while respecting amine:acrylate ratio of 1:1. After a determined reaction time, the mixture was both:
- spread between two polypropylene film and laminated between two $CaF_2$ pellets (film thickness: 50 μm). Laminated samples were finally cured using a Roithner LaserTechnik LED395-66-60-110 (395 nm) at 70 $mW/cm^2$ (FTIR and DSC data),
- spread onto a polypropylene film (film thickness: 70 μm), samples were finally cured using a LED (395 nm) onto a conveyor belt with a dose of 7 $J/cm^2$ (DMA data).

The resulting films combined thermomechanical properties of polyacrylate and polymethacrylate networks. Thus, in a second aspect, the method of the invention provides a new method for synthesizing IPN: a two step method combining a thermal polymerization step at room temperature (Aza-Michael click reaction) and a photopolymerization step.

Example 5B—IPN (N,N'-dimethyl-1,6-hexanediamine+EBAD+SR348C®)

The same reaction protocol as Example 5A was used, replacing DP with N,N'-dimethyl-1,6-hexanediamine. Similar results to Example 5A were obtained.

Example 5B—IPN (N,N'-dimethyl-1,6-hexanediamine+divinylsulfone+SR348C®)

The same reaction protocol as Example 5A was used, replacing DP-EBAD with a mixture N,N'-dimethyl-1,6-hexanediamine-divinylsulfone in a ratio 1:1 Similar results to Example 5A were obtained.

Example 6—Pliable Coatings

Method: Briefly, Irgacure 819® (2.5 wt %) was first added to the acrylate and then, the mixture was mixed with DP in a pillbox. After a determined reaction time, the mixture was:

$1^{st}$: spread (70 μm) onto an aluminum plate (pliability test) or a glass plate (Persoz test)

$2^{nd}$: photopolymerized

Persoz Hardness

Persoz hardness was determined using an Elcometer® Persoz Pendulum Hardness tester 220 V model (Persoz hardness of glass is 420 s). To characterize our samples, time taken for the amplitude of oscillation to decrease from 12° to 4° was characterized.

Pliability

Flexibility/elongation is the pliability or rigidity of a material. It expresses the extent to which it resists bending. Pliability was investigated through a bend test. A mandrel with a diameter of 8 mm was used. Samples made on aluminium plates were hence bent uniformly on this mandrel and samples were examined (naked eyes) to point out the apparition of cracks or failures.

Systems Tested:
- EBAD+2,5 wt % BAPO (hv only)—comparative Example 6A
- EBAD+HDDA (ratio 1:4)+2,5 wt % BAPO (hv only)—comparative Example 6B
- EBAD/DP (cadaverine) (ratio 1:4)+2,5 wt % BAPO (AZ1+hv+AZ2)—Example 6C.

In comparative Example 6B, HDDA functions as a diluent. This comparative Example was carried out to simulate the addition of a polymer network increasing flexibility properties.

Figure 8:
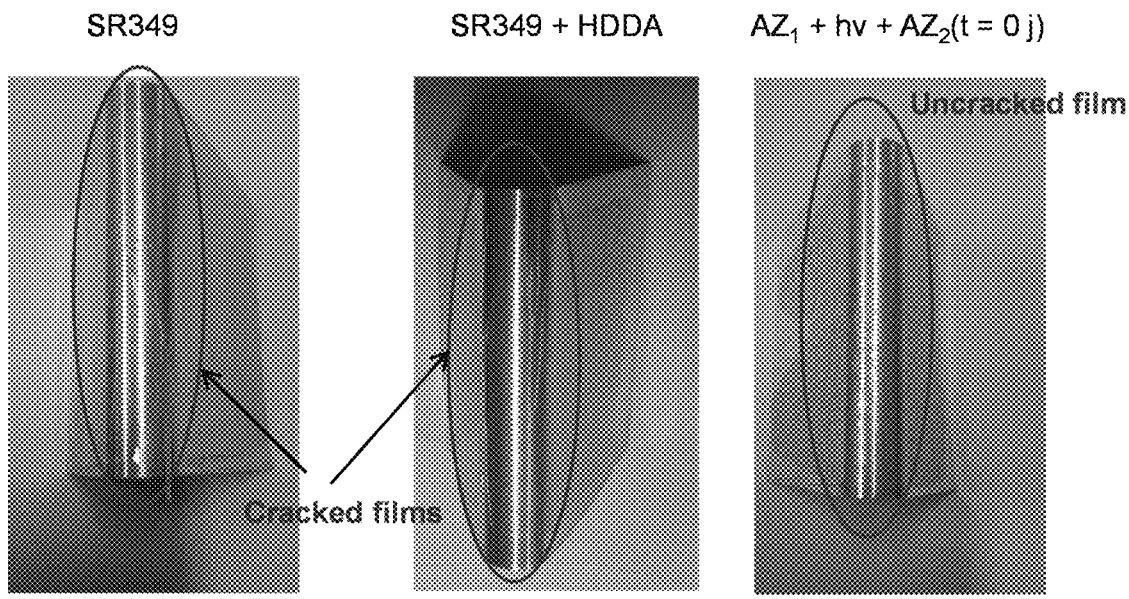
FIG. 8 depicts the results of the pliability tests of Example 6.

The results of the pliability tests are provided in FIG. 8: the film made according to the invention (Example 6C) was pliable and did not break. The other two broke (comparative Examples 6A and 6B).

The results of the Persoz tests are provided in Table 5 (for reference, Persoz hardness of glass is 420 s).

TABLE 5

| Persoz Hardness (s) | t = 0 d | | t = 2 d | | t = 7 d | | t = 14 d | | t = 21 d | |
|---|---|---|---|---|---|---|---|---|---|---|
| EBAD | 232 | | 234 | | 231 | | 232 | | 229 | |
| | 234 | 235 | 230 | 234 | 232 | 232 | 230 | 232 | 231 | 231 |
| | 238 | | 239 | | 233 | | 234 | | 233 | |

TABLE 5-continued

| Persoz Hardness (s) | t = 0 d | | | t = 2 d | | | t = 7 d | | | t = 14 d | | t = 21 d | |
|---|---|---|---|---|---|---|---|---|---|---|---|---|---|
| EBAD + HDDA | 190 | | | | | | 195 | | | | | | |
| (ratio 1:4) | 192 | 193 | | | | | 194 | 193 | | | | | |
| | 198 | | | | | | 190 | | | | | | |
| AZ1 + hv + AZ2 | 110 | | | 316 | | | 364 | | | 368 | | 375 | |
| | 112 | 113 | | 315 | 314 | | 362 | 362 | | 375 | 370 | 370 | 373 |
| | 118 | | | 311 | | | 360 | | | 367 | | 374 | |

In conclusion, the film made according to the invention exhibits both a high hardness and an increased elasticity. This illustrates the advantage of the two networks (AZ and photopolymerization): the resulting film inherits mechanical properties from both. Most notably, the film of Example 6C still did not break after stage 3 (AZ2) was completed, even though the film had a higher hardness.

Figure 9:
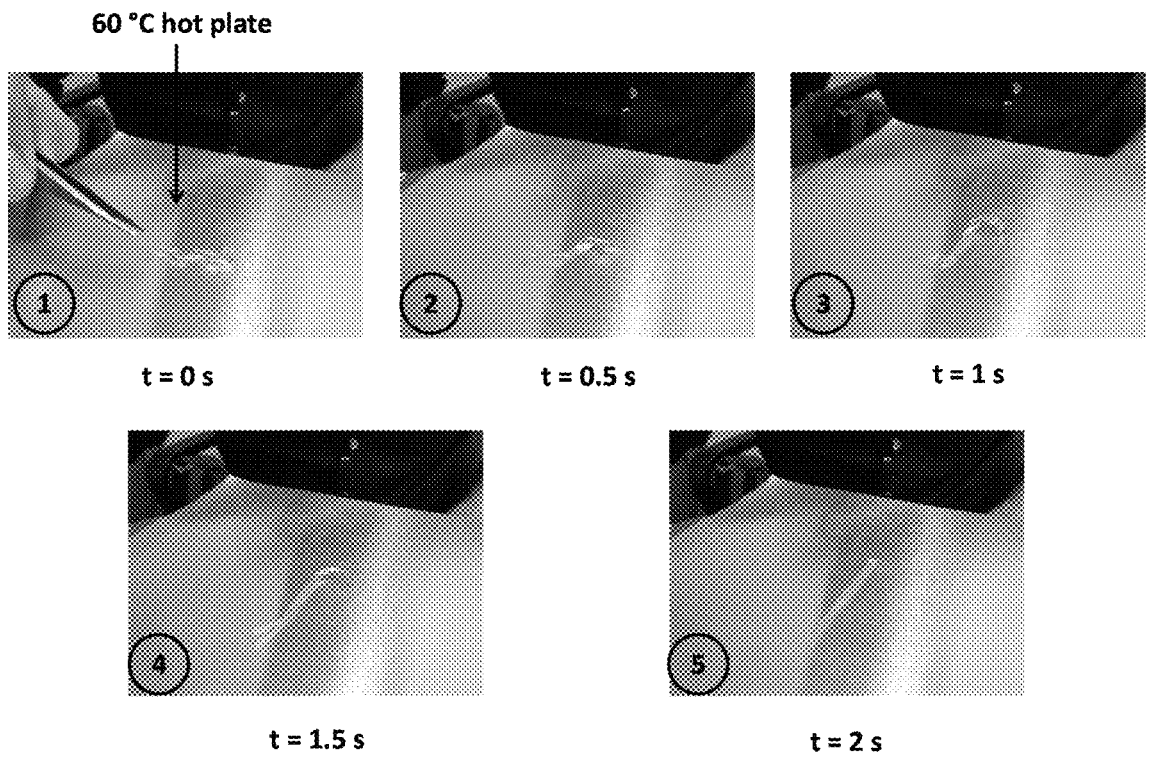
FIG. 9 illustrates the memory-shape properties of the polymer film of Example 6 according to the invention.

In addition, the film exhibited shape-memory properties, as evidenced in FIG. 9.

Example 7—Composites

Briefly, Irgacure 819® (2.5 wt %) was first added to the acrylate and then, the mixture was mixed with DP in a pillbox. After a determined reaction time, the mixture was impregnated manually onto 6 plies of unidirectional glass fibers (450 g/m$^2$). The 6-ply samples were finally cured using a LED (395 nm) onto a conveyor belt with a dose of 14 J/cm$^2$. Final samples had a thickness of 2 mm and were tested on an Instrom tensile test machine according to ISO 14130: Determination of apparent interlaminar shear strength by short-beam method.

Tested Samples:
Sample 1: SR833s+2,5 wt % BAPO (hv only)—comparative Example 7A
Sample 2: SR833s+cadaverine (ratio 1:4)+2,5 wt % BAPO (AZ1+hv+AZ2)—Example 7B Flexural strengths obtained at different stages are gathered in Table 6. Results show that obtained flexural strengths were the same for both samples just after irradiation. However, after 7 days, flexural strength of sample 2 increased by a factor 1.6 proving the interest of the AZ2 reaction which, in that case, serves to strengthening linkages between plies.

TABLE 6

| | | Flexural strength (MPa) |
|---|---|---|
| t = 0 j | SR833s + 2.5 wt % BAPO | 331 ± 13 |
| | SR833s + cadaverine (ratio 1:4) + 2.5 wt % BAPO | 385 ± 17 |
| t = 7 j | SR833s + 2.5 wt % BAPO | 341 ± 25 |
| | SR833s + cadaverine (ratio 1:4) + 2.5 wt % BAPO | 530 ± 23 |

While we have described a number of embodiments of this invention, it is apparent that our basic examples may be altered to provide other embodiments that utilize the methods of this invention. Therefore, it will be appreciated that the scope of this invention is to be defined by the appended claims rather than by the specific embodiments that have been represented by way of example.

LIST OF REFERENCES

1. WO 94/22968
5. EP0276501A1
6. EP0249201A1
7. WO 97/12945
8. EP0008127A1
9. J. Kloosterboer, in Electronic Applications, Vol. 84, Springer Berlin Heidelberg, 1988, pp. 1-61.
10. J. G. Kloosterboer, G. F. C. M. Lijten, in Biological and Synthetic Polymer Networks (Ed.: O. Kramer), Springer Netherlands, 1988, pp. 345-355.
11. D. P. Nair, N. B. Cramer, J. C. Gaipa, M. K. McBride, E. M. Matherly, R. R. McLeod, R. Shandas, C. N. Bowman, Advanced Functional Materials 2012, 22, 1502-1510.
12. D. P. Nair, N. B. Cramer, M. K. McBride, J. C. Gaipa, R. Shandas, C. N. Bowman, Polymer 2012, 53, 2429-2434.
13. D. P. Nair, N. B. Cramer, M. K. McBride, J. C. Gaipa, N. C. Lee, R. Shandas, C. N. Bowman, Macromolecular Symposia 2013, 329, 101-107.

All patent(s) and publication(s) mentioned in this specification are herein incorporated by reference to the same extent as if each individual publication was specifically and individually indicated to be incorporated by reference.

The invention claimed is:

1. A dual cure polymerization process comprising:
(i) reacting an electrophile monomer having the structure (I) or (II):

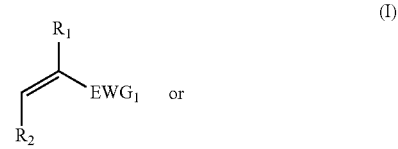

wherein:
$R_1$ represents H, methyl or CN;
$R_2$ represents H or, when $EWG_1$ represents —C(=O)NHR$^A$, $R_2$ and R$^A$ together represent an oxo moiety —C(=O)—;
$EWG_1$ and $EWG_2$ independently represent an electron withdrawing group which may contain one or more additional Michael acceptor double-bonds and/or radically polymerizable double-bonds;
with a nucleophile monomer, $R_3$—$NH_2$, bearing a primary amine functional group wherein $R_3$ represents the nucleophile monomer radical;
wherein the molar ratio (Michael acceptor double-bonds of the electrophile monomer)/(primary amine functional groups of the nucleophile monomer) is at least 4:1;

thereby forming a secondary amine Michael adduct ($I^4$) or ($II^4$) having the structure:

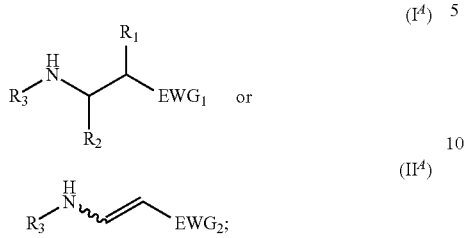

wherein the % conversion of the Michael acceptor double-bonds of the electrophile monomer is ≤25% after completion of step (i);

ii subjecting the product obtained in step i) to a suitable light source to effect photopolymerization of residual unreacted Michael acceptor double-bonds and/or radically polymerizable double bonds; and iii allowing the Michael adduct secondary amine functional groups to further undergo Michael addition with residual unreacted Michael acceptor double-bonds.

2. The polymerization process according to claim 1, wherein:

$R_1$ and $R_2$ are each H, or $R_1$ is —CN and $R_2$ is H when EWG1 represents —C(=O)CN;

$EWG_1$ represents:

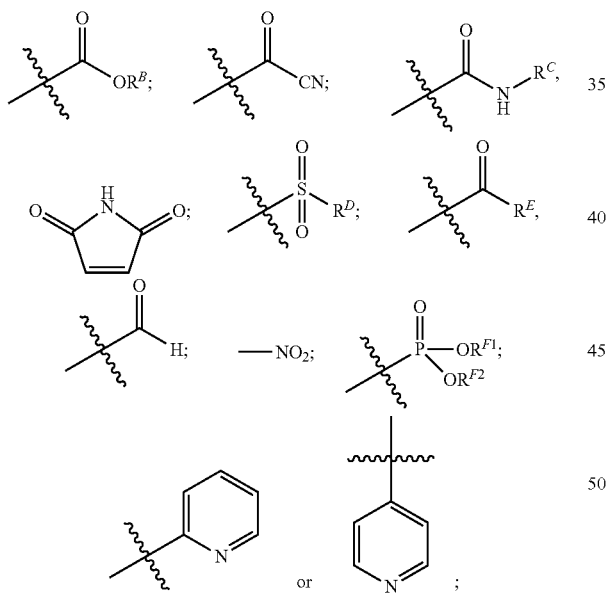

and
$EWG_2$ represents:

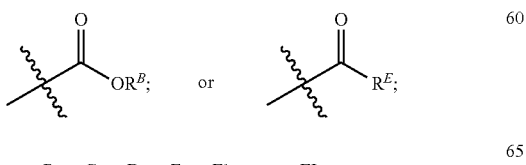

wherein $R^B$, $R^C$, $R^D$, $R^E$, $R^{F1}$ and $R^{F2}$ are as defined as follows:

wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{B1}$ where $R^{B1}$ represents $C_{1-6}$alkyl; and each of the alkyl, alkenyl and alkynyl moieties may be linear, branched or cyclic;

wherein $R^C$ represents H, $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{C1}$ where $R^{C1}$ represents $C_{1-6}$alkyl; and each of the alkyl, alkenyl and alkynyl moieties may be linear, branched or cyclic;

the electrophile monomer (I) represents a maleimide monomer having the structure

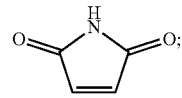

wherein $R^D$ represents $C_{1-20}$alkyl, $C_{1-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{D1}$ where $R^{D1}$ represents $C_{1-6}$alkyl; and each of the alkyl, alkenyl and alkynyl moieties may be linear, branched or cyclic;

wherein $R^E$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{E1}$ where $R^{E1}$ represents $C_{1-6}$alkyl; and each of the alkyl, alkenyl and alkynyl moieties may be linear, branched or cyclic;

wherein $R^{F1}$ and $R^{F2}$ independently represent $C_{1-20}$alkyl, $C_{2-20}$alkenyl, $C_{2-20}$alkynyl, $C_{7-20}$aralkyl, or $C_{6-10}$aryl; wherein each of the foregoing groups may be substituted with halogen, —CN, $C_{1-6}$alkyl, $C_{6-10}$aryl, or —$OR^{FF1}$where $R^{FF1}$ represents $C_{1-6}$alkyl; and each of the alkyl, alkenyl and alkynyl moieties may be linear, branched or cyclic;

wherein each of the $R^B$, $R^C$, $R^D$, $R^E$, $R^{F1}$ and $R^{F2}$ substituents may further bear one or more acryl or methacryl groups:

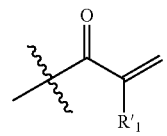

wherein R'1 represents H or methyl.

3. The polymerization process according to claim 1, wherein $R_3$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{6-10}$aryl, 5 or 6-membered heteroaryl, or 5 or 6-membered heterocycle; wherein each of the foregoing groups may be substituted with —$NH_2$, halogen, —CN, $C_{1-6}$alkyl, —C(=O)O$R^{3A}$ where $R^{3A}$ represents $C_{1-6}$alkyl or $C_{6-10}$aryl, or —O$R^{3B}$ where $R^{3B}$ represents H, $C_{1-6}$alkyl or $C_{6-10}$aryl which may further be substituted with —$NH_2$; and each of the alkyl, alkenyl and alkynyl moieties may be linear, branched or cyclic.

4. The polymerization process according to claim 1, wherein the electrophile monomer contains one Michael acceptor double-bond, and the nucleophile monomer contains one primary amine functional group.

5. The polymerization process according to claim 1, wherein the electrophile monomer contains two Michael acceptor double-bonds, and the nucleophile monomer contains two primary amine functional groups.

6. The polymerization process according to claim 5, wherein the electrophile monomer has the structure:

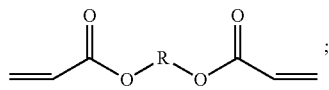

wherein R represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, —O$R^A$ where $R^A$ represents $C_{1-6}$alkyl; and each of the alkyl, alkenyl and alkynyl moieties may be linear, branched or cyclic;

and the nucleophile monomer has the structure $NH_2R'NH_2$, wherein R' represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{6-10}$aryl, or 5 or 6-membered heteroaryl; wherein each of the foregoing groups may be substituted with halogen, —CN, $C_{1-6}$alkyl, —O$R'^A$ where $R'^A$ represents $C_{1-6}$alkyl; and each of the alkyl, alkenyl and alkynyl moieties may be linear, branched or cyclic.

7. The polymerization process according to claim 6, wherein the electrophile monomer is a polyester acrylate, a urethane acrylate, an epoxy acrylate or an acrylate monomer such as one of the following: Tertiobutyl cyclohexanol acrylate (TBCHA), 2-(2-ethoxyethoxy) ethyl acrylate (EOEOEA), C16/C18 alkyl acrylate, Tetrahydrofurfuryl acrylate (THFA), C12 alkyl acrylate (Lauryl acrylate), C12/C14 acrylate, 2-phenoxyethyl acrylate (2-PEA), Isodecyl acrylate (IDA), Ethoxylated 4 phenyl acrylate (P4EOA), 3,3,5-trimethyl cyclohexanol acrylate (TMCHA), Iso octyl acrylate (IOA), Octyl decyl acrylate (ODA), Tridecyl acrylate (TDA), Polycaprolactone acrylate (CAPA), Ethoxylated 4 nonyl phenol acrylate (NP4EOA), Isobornyl acrylate (IBOA), Cyclic trimethylolpropane formal acrylate (CTFA), Ethoxylated (5) hexanediol diacrylate (HD5EODA), C18 alkyl acrylate (Stearyl acrylate), C18/C22 alkyl acrylate (Behenyl acrylate), 1,6-hexanediol diacrylate (HDDA), Polyethylene glycol (200) diacrylate (PEG200DA), Tetraethylene glycol diacrylate (TTEGDA), Triethylene glycol diacrylate (TIEGDA), Tripropylene glycol diacrylate (TPGDA), Polybutadiene diacrylate (PBDDA), 3-methyl 1,5-pentanediol diacrylate (MPDA), Polyethylene glycol (400) diacrylate (PEG400DA), Ethoxylated 3 bisphenol A diacrylate (BPA3EODA), Dipropylene glycol diacrylate (DPGDA), 1,10 decanediol diacrylate (DDDA), Ethoxylated 4 bisphenol A diacrylate (BPA4EODA), Ethoxylated 10 bisphenol A diacrylate (BPA10EODA), Esterdiol diacrylate (EDDA), Polyethylene glycol 600 diacrylate (PEG600DA), Alkoxylated diacrylate, Tricyclodecanedimethanol diacrylate (TCDDMDA), Propoxylated 2 neopentyl glycol diacrylate (PONPGDA), Trimethylolpropane triacrylate (TMPTA), Tris (2-hydroxyethyl) isocyanurate triacrylate (THEICTA), Pentaerythritol triacrylate (PETIA), Ethoxylated 3 trimethylolpropane triacrylate (TMP3EOTA), Propoxylated 3 trimethylolpropane triacrylate (TMP3POTA), Ethoxylated 6 trimethylolpropane triacrylate (TMP6EOTA), Ethoxylated 9 trimethylolpropane triacrylate (TMP9EOTA), Propoxylated 3 glyceryl triacrylate (GPTA), Ethoxylated 15 trimethylolpropane triacrylate (TMP15EOTA), Trimethylolpropane triacrylate (TMPTA), Ethoxylated 12 glyceryl triacrylate (G12EOTA), Ethoxylated (20) trimethylolpropane triacrylate (TMP20EOTA), Ethoxylated 4 pentaerythritol tetraacrylate (PETTA), Di-trimethylolpropane tetraacrylate (Di TMPTTA), Dipentaerythritol pentaacrylate (Di PEPA),

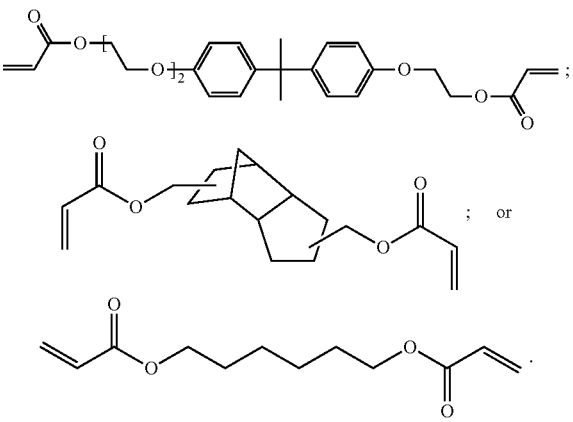

8. The polymerization process according to claim 1, wherein the nucleophilic monomer is an aliphatic or cyclo-aliphatic mono-, bi- or tri-functional primary amine including hexylamine, diethylaminopropylamine, 1,3-Dimethylamylamine, Ethanolamine, Isobutylamine, Tyramine, 1,2-diaminoethane NH2-(CH2)2-NH2, 1,4-diaminobutane NH2-(CH2)4-NH2, 1,6-diaminohexane NH2-(CH2)6-NH2, 1,8-diaminooctane NH2-(CH2)8-NH2, 1,12-diaminododecane NH2-(CH2)12-NH2, 1,16-diaminohexadecane NH2-(CH2)16-NH2, isophorone diamine (IPDA), 3,3'-Dimethyl-4,4'diamino-dicyclohexylmethane, Neopentanediamine, 3,3'-Diamino-N-methyldipropylamine, 1,3-Cyclohexanebis(methylamine), 1,2-Diaminocyclohexane, 2,2-Bis(aminoethoxy)propane, 1,5-Diamino-2-methylpentane, 4,4'-Methylenebis(cyclohexylamine), 4,4'-Methylenebis(2,6-diethylaniline), 3,3'-Methylenedianiline, 4,4'-(1,4-Phenylenediisopropylidene)bisaniline, 4,4'-(1,3-Phenylenedioxy)dianiline, Poly(1,4-butanediol)bis(4-aminobenzoate), 2,4,6-Trimethyl-m-phenylenediamine or tris(2-aminoethyl)amine N[(CH2)2—NH2]3; or an aromatic primary amine including Ar-CH2-NH2, NH2-Ar—NH2, NH2-CH2-Ar-CH2-NH2, NH2-Ar—CH2-NH2, Ar-CH2-NH—(CH2)2-NH2, NH2-Ar—Ar—NH2 or NH2-Ar—O—Ar—NH2, wherein Ar represents a substituted or unsubstituted phenyl moiety.

9. The polymerization process according to claim 1, wherein in the initial polymerization reaction mixture, the ratio (Michael acceptor double-bonds of the electrophile monomer)/(primary amine functional groups of the nucleophile monomer) ranges from 4/1 to 100/1.

10. The polymerization process according to claim 1, wherein the light source used in step ii) is a UV or visible light source.

11. The polymerization process according to claim 1, wherein step ii) is carried out in the presence of a photoinitiator.

12. The polymerization process according to claim 11, wherein the photoinitiator is selected from:
   a) Type I free radical photoinitiators from the family of acetophenones, alkoxyacetophenones and derivatives; from the family of hydroxyacetophenones and derivatives; from the family of alkylaminoacetophenones and derivatives; from the family of benzoin ethers and derivatives; from the family of phosphine oxides and derivatives;
   b) Type II free radical photoinitiators from the family of benzophenones and derivatives; from the family of thioxanthones and derivatives; from the family of guinones and derivatives; from the family of benzoyl formate esters and derivatives; from the family of metallocenes and derivatives; from the family of dibenzylidene ketones and derivatives; from the family of coumarines and derivatives;
   c) photoinitiators from the family of dyes including triazines and derivatives, fluorones and derivatives, cyanines and derivatives, safranines and derivatives, 4,5,6,7-tetrachloro-3',6'-dihydroxy-2',4',5',7'-tetraiodo-3H-spiro[isobenzofuran-1,9'-xanthen]-3-one, pyrylium or thiopyrylium and derivatives, thiazines and derivatives, flavines and derivatives, pyronines and derivatives, oxazines and derivatives, rhodamines and derivatives; or
   d) a mixture of at least two of the aforementioned photoinitiators.

13. The polymerization process according to claim 1, wherein the process is carried out in the absence of a catalyst and the electrophile monomer has the structure:

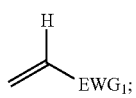

wherein $EWG_1$ represents

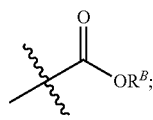

wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{B1}$ where $R^{B1}$ represents $C_{1-6}$alkyl; and each of the alkyl, alkenyl and alkynyl moieties may be linear, branched or cyclic;

wherein $R^B$ may further bear one or more acryl or methacryl groups:

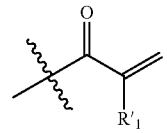

wherein R'1 represents H or methyl.

14. The polymerization process according to claim 1, wherein the electrophile and nucleophile monomers are liquid at room temperature, so that the process is carried out in the absence of solvent.

15. The polymerization process according to claim 1, wherein step iii) is carried out without additional energy or processing step other than letting the secondary aza-Michael addition reaction proceed at room temperature, thereby allowing the polymer product to spontaneously consolidate.

16. The dual cure polymerization process of claim 1 comprising:
   (i) providing a mixture including:
      an electrophile monomer (I) having the structure:

an electrophile monomer (II) having the structure:

wherein $EWG_{1A}$ and $EWG_{1B}$ independently represent an electron withdrawing group which may contain one or more additional Michael acceptor double-bonds and/or radically polymerizable double bonds; and
      a nucleophile monomer, $R_{3A}$—NH—$R_{3B}$, bearing a primary or secondary amine functional group wherein $R_{3A}$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{6-10}$aryl, or 5 or 6-membered heteroaryl; $R_{3B}$ represents H, $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{6-10}$aryl, or 5 or 6-membered heteroaryl; wherein each of the foregoing groups may be substituted with —$NH_2$, halogen, —CN, $C_{1-6}$alkyl, or —$OR^{2A}$ where $R^{2A}$ represents $C_{1-6}$alkyl; and each of the alkyl, alkenyl and alkynyl moieties may be linear, branched or cyclic;
      wherein the Michael acceptor double-bonds of the electrophile monomer (I) are in stoichiometric amount relative to the primary amine functional groups of the nucleophile monomer;

and wherein the electrophile monomer (II) is unreactive towards Michael addition of the nucleophile monomer;

(ii) allowing the nucleophile monomer to undergo Michael addition with the electrophile monomer (I) under suitable conditions thereby forming a first Michael adduct ($I^4$) having the structure:

(iii) subjecting the product obtained in step ii) to a suitable light source to effect photopolymerization of monomer (II), thereby forming an interpenetrating polymer network.

17. The polymerization process according to claim 16, wherein $EWG_1$ and $EWG_2$ independently represent:

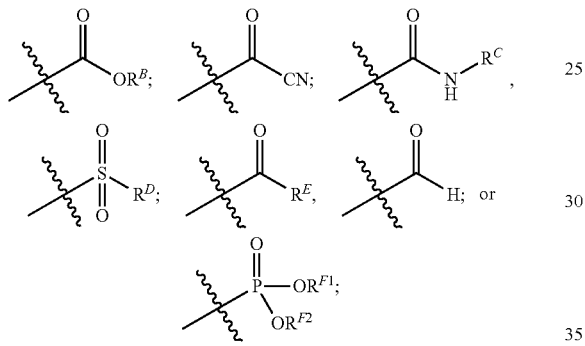

wherein $R^B$, $R^C$, $R^D$, $R^E$, $R^{F1}$ and $R^{F2}$ are as defined as follows:

wherein $R^B$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{B1}$ where $R^{B1}$ represents $C_{1-6}$alkyl; and each of the alkyl, alkenyl and alkynyl moieties may be linear, branched or cyclic;

wherein $R^C$ represents H, $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{C1}$ where $R^{C1}$ represents $C_{1-6}$alkyl; and each of the alkyl, alkenyl and alkynyl moieties may be linear, branched or cyclic;

wherein $R^D$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{D1}$ where $R^{D1}$ represents $C_{1-6}$alkyl; and each of the alkyl, alkenyl and alkynyl moieties may be linear, branched or cyclic;

wherein $R^E$ represents $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, or —$OR^{E1}$ where $R^{E1}$ represents $C_{1-6}$alkyl; and each of the alkyl, alkenyl and alkynyl moieties may be linear, branched or cyclic;

wherein $R^{F1}$ and $R^{F2}$ independently represent $C_{1-20}$alkyl, $C_{2-20}$alkenyl, $C_{2-20}$alkynyl, $C_{7-20}$aralkyl, or $C_{6-10}$aryl; wherein each of the foregoing groups may be substituted with halogen, —CN, $C_{1-6}$alkyl, $C_{6-10}$aryl, or —$OR^{FF1}$ where $R^{FF1}$ represents $C_{1-6}$alkyl; and each of the alkyl, alkenyl and alkynyl moieties may be linear, branched or cyclic;

wherein each of the $R^B$, $R^C$, $R^D$, $R^E$, $R^{F1}$ and $R^{F2}$ substituents may further bear one or more acryl or methacryl groups:

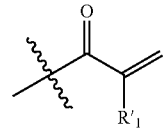

wherein R'1 represents H or methyl.

18. The polymerization process according to claim 16, wherein electrophile monomer (I) is an acrylate monomer having the structure:

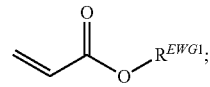

electrophile monomer (II) is a methacrylate monomer having the structure:

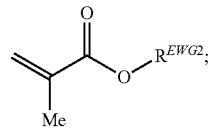

wherein $R^{EWG1}$ and $R^{EWG2}$ independently represent $C_{1-20}$alkyl, $C_{2-20}$alkenyl, $C_{2-20}$alkynyl, $C_{1-20}$heteroalkyl, $C_{2-20}$heteroalkenyl, $C_{2-20}$heteroalkynyl, $C_{7-20}$aralkyl, $C_{1-20}$heteroalkyl$C_{6-10}$aryl, $C_{6-10}$aryl, 5 or 6-membered heteroaryl or 5 or 6-membered heterocycle; wherein each of the foregoing groups may be substituted with halogen, —CN, $C_{1-6}$alkyl, $C_{6-10}$aryl, —$OR^{2A}$ where $R^{2A}$ represents $C_{1-6}$alkyl; and each of the alkyl, alkenyl and alkynyl moieties may be linear, branched or cyclic; wherein $R^{EWG1}$ may further bear one or more acrylate groups and $R^{EWG2}$ may further bear one or more methacrylate groups.

19. The polymerization process according to claim 16, wherein $R_{3A}$—NH—$R_{3B}$ represents a primary amine as defined below, or an aliphatic, cyclo-aliphatic or aromatic secondary amine including N,N'-Dimethyl-1,6-hexanediamine, N,N'-Diethyl-2-butene-1,4-diamine, N,N'-Diisopropylethylenediamine, N,N'-Diisopropyl-1,3-propanediamine, N,N'-Dimethyl-1,3-propanediamine, N,N'-Diphenyl-p-phenylenediamine or 1,4,8,12-Tetraazacyclopentadecane;
  wherein the primary amine may be an aliphatic or cycloaliphatic mono-, bi- or tri-functional primary amine including hexylamine, diethylaminopropylamine, 1,3-Dimethylamylamine, Ethanolamine, Isobutylamine, Tyramine, 1,2-diaminoethane NH2-(CH2)2-NH2, 1,4-diaminobutane NH2-(CH2)4-NH2, 1,6-diaminohexane NH2-(CH2)6-NH2, 1,8-diaminooctane NH2-(CH2)8-NH2, 1,12-diaminododecane NH2-(CH2)12-NH2, 1,16-diaminohexadecane NH2-(CH2)16-NH2, isophorone diamine (IPDA), 3,3'-Dimethyl-4,4'diaminodicyclohexylmethane, Neopentanediamine, 3,3'-Diamino-N-methyldipropylamine, 1,3-Cyclohexanebis(methylamine), 1,2-Diaminocyclohexane, 2,2-Bis(aminoethoxy)propane, 1,5-Diamino-2-methylpentane, 4,4'-Methylenebis(cyclohexylamine), 4,4'-Methylenebis(2,6-diethylaniline), 3,3'-Methylenedianiline, 4,4'-(1,4-Phenylenediisopropylidene)bisaniline, 4,4'-(1,3-Phenylenedioxy)dianiline, Poly(1,4-butanediol)bis(4-aminobenzoate), 2,4,6-Trimethyl-m-phenylenediamine or tris(2-aminoethyl)amine N[(CH2)2-NH$_2$]3; or an aromatic primary amine including Ar-CH2-NH2, NH2-Ar—NH2, NH2-CH2-Ar-CH2-NH2, NH2-Ar-CH2-NH2, Ar-CH2-NH—(CH2)2-NH2, NH2-Ar—Ar—NH2 or NH2-Ar—O—Ar—NH2, wherein Ar represents a substituted or unsubstituted phenyl moiety.

20. The polymerization process according to claim 16, wherein step (ii) is carried out in the presence of a photoinitiator including:

a. Type I free radical photoinitiators
  i. from the family of acetophenones, alkoxyacetophenones and derivatives;
  ii. from the family of hydroxyacetophenones and derivatives;
  iii. from the family of alkylaminoacetophenones and derivatives;
  iv. from the family of benzoin ethers and derivatives;
  v. from the family of phosphine oxides and derivatives;
b. Type II free radical photoinitiators
  i. from the family of benzophenones and derivatives;
  ii. from the family of thioxanthones and derivatives;
  iii. from the family of quinones and derivatives;
  iv. from the family of benzoyl formate esters and derivatives;
  v. from the family of metallocenes and derivatives;
  vi. from the family of dibenzylidene ketones and derivatives;
  vii. from the family of coumarines and derivatives;
c. photoinitiators from the family of dyes including triazines and derivatives, fluorones and derivatives, cyanines and derivatives, safranines and derivatives, 4,5,6,7-tetrachloro-3',6'-dihydroxy-2',4',5',7'-tetraiodo-3H-spiro[isobenzofuran-1,9'-xanthen]-3-one, pyrylium or thiopyrylium and derivatives, thiazines and derivatives, flavines and derivatives, pyronines and derivatives, oxazines and derivatives, rhodamines and derivatives; or
d. a mixture of at least two of the aforementioned photoinitiators.

* * * * *